US011641224B2

(12) United States Patent
Rahman et al.

(10) Patent No.: US 11,641,224 B2
(45) Date of Patent: May 2, 2023

(54) METHOD AND APPARATUS FOR ROBUST MIMO TRANSMISSION

(71) Applicant: Samsung Electronics Co., Ltd., Suwon-si (KR)

(72) Inventors: Md. Saifur Rahman, Plano, TX (US); Eko Onggosanusi, Coppell, TX (US); Dalin Zhu, Richardson, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/557,671

(22) Filed: Dec. 21, 2021

(65) Prior Publication Data

US 2022/0200670 A1 Jun. 23, 2022

Related U.S. Application Data

(60) Provisional application No. 63/130,327, filed on Dec. 23, 2020, provisional application No. 63/133,023, filed on Dec. 31, 2020.

(51) Int. Cl.
*H04B 7/0456* (2017.01)
*H04B 17/364* (2015.01)
*H04L 5/00* (2006.01)
*H04B 7/08* (2006.01)

(52) U.S. Cl.
CPC ........... *H04B 7/0456* (2013.01); *H04B 7/086* (2013.01); *H04B 17/364* (2015.01); *H04L 5/0023* (2013.01)

(58) Field of Classification Search
CPC .. H04B 7/0456; H04B 17/364; H04B 17/318; H04B 17/336; H04B 7/086;
(Continued)

(56) References Cited

U.S. PATENT DOCUMENTS 9,936,470 B2 * 4/2018 Eyuboglu ........... H04W 56/001
10,039,097 B2 * 7/2018 Polehn .............. H04W 72/0446
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.6.0, Jun. 2021, 249 pages.
(Continued)

*Primary Examiner* — Khanh C Tran

(57) ABSTRACT

A method for operating a user equipment (UE) comprises receiving information about a downlink (DL) transmission transmitted from $N_{RRH}>1$ RRHs, wherein: $N_{RRH}$=number of remote radio heads (RRHs), RRH r comprises a group of antenna ports, and $r=1, \ldots, N_{RRH}$; receiving the DL transmission; and decoding the information about the DL transmission; wherein the DL transmission is based on a scheme that is a combination of a precoding scheme and a diversity scheme, wherein the precoding scheme corresponds to applying an intra-RRH precoder component to antenna ports within an RRH, and wherein the diversity scheme corresponds to applying an inter-RRH diversity component to antenna ports across RRHs.

20 Claims, 18 Drawing Sheets

(58) Field of Classification Search
CPC .. H04B 7/0639; H04B 7/0619; H04B 7/0617; H04B 7/0413; H04L 5/0023
See application file for complete search history.

(56) References Cited

U.S. PATENT DOCUMENTS

| | | | |
|---|---|---|---|
| 10,264,626 B2 * | 4/2019 | Lee | H04W 84/042 |
| 11,444,809 B2 * | 9/2022 | Hanson | H04L 49/351 |
| 2012/0189074 A1 | 7/2012 | Jin et al. | |
| 2013/0039349 A1 * | 2/2013 | Ebrahimi Tazeh Mahalleh | H04L 5/0048 370/336 |
| 2013/0083681 A1 * | 4/2013 | Ebrahimi Tazeh Mahalleh | H04B 7/0626 370/252 |
| 2013/0322361 A1 * | 12/2013 | Ko | H04B 7/0632 370/329 |
| 2017/0084995 A1 | 3/2017 | Yang | |
| 2017/0359108 A1 | 12/2017 | Abdel Khalek et al. | |
| 2018/0220458 A1 * | 8/2018 | Ouchi | H04W 16/14 |
| 2018/0234146 A1 | 8/2018 | Onggosanusi et al. | |
| 2018/0241454 A1 * | 8/2018 | Lee | H04L 5/0048 |
| 2019/0074876 A1 | 3/2019 | Kakishima et al. | |

OTHER PUBLICATIONS

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.6.0, Jun. 2021, 256 pages.

"3rd Generation Partnership Project; Technical Specification Group Radio Access Network; Evolved Universal Terrestrial Radio Access (E-UTRA); Physical layer procedures (Release 16)", 3GPP TS 36.213 V16.6.0, Jun. 2021, 577 pages.

"LTE; Evolved Universal Terrestrial Radio Access (E-UTRA); Medium Access Control (MAC) protocol specification (3GPP TS 36.321 version 16.6.0 Release 16)", ETSI TS 136 321 V16.6.0, Technical Specification, Oct. 2021, 144 pages.

"LTE; Evolved Universal Terrestrial Radio Access (E-UTRA); Radio Resource Control (RRC); Protocol specification (3GPP TS 36.331 version 16.6.0 Release 16)", ETSI TS 136 331 V16.6.0, Technical Specification, Oct. 2021, 1098 pages.

"3rd Generation Partnership Project; Technical Specification Group Services and System Aspects; Feasibility Study on New Services and Markets Technology Enablers; Stage 1 (Release 14)", 3GPP TR 22.891 V14.2.0, Sep. 2016, 95 pages.

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for data (Release 16)", 3GPP TS 38.214 V16.6.0, Jun. 2021, 172 pages.

International Search Report and Written Opinion dated Mar. 28, 2022 regarding International Application No. PCT/KR2021/019702, 7 pages.

* cited by examiner

METHOD AND APPARATUS FOR ROBUST MIMO TRANSMISSION

CROSS-REFERENCE TO RELATED APPLICATIONS AND CLAIM OF PRIORITY

The present application claims priority to U.S. Provisional Patent Application No. 63/130,327, filed on Dec. 23, 2020; and U.S. Provisional Patent Application No. 63/133,023, filed on Dec. 31, 2020. The content of the above-identified patent documents is incorporated herein by reference.

TECHNICAL FIELD

The present disclosure relates generally to wireless communication systems and more specifically to a distributed multiple input-multiple output (MIMO) transmission based on a scheme that is a combination of a precoding scheme and a diversity scheme.

BACKGROUND

Understanding and correctly estimating the channel between a user equipment (UE) and a base station (BS) (e.g., gNode B (gNB)) is important for efficient and effective wireless communication. In order to correctly estimate the downlink (DL) channel conditions, the gNB may transmit a reference signal (RS), e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses to enable DL transmission from a distributed MIMO system based on a scheme that is a combination of a precoding scheme and a diversity scheme.

In one embodiment, a UE for CSI reporting in a wireless communication system is provided. The UE includes a transceiver configured to: receive information about a DL transmission transmitted from $N_{RRH}>1$ RRHs, wherein: $N_{RRH}=$number of remote radio heads (RRHs), RRH r comprises a group of antenna ports, and r=1, . . . , $N_{RRH}$; and receive the DL transmission. The UE further includes a processor operably connected to the transceiver. The processor is configured to decode the information about the DL transmission; wherein the DL transmission is based on a scheme that is a combination of a precoding scheme and a diversity scheme, wherein the precoding scheme corresponds to applying an intra-RRH precoder component to antenna ports within an RRH, and wherein the diversity scheme corresponds to applying an inter-RRH diversity component to antenna ports across RRHs.

In another embodiment, a BS in a wireless communication system is provided. The BS includes a processor configured to generate information about a DL transmission transmitted from $N_{RRH}>1$ RRHs, wherein: $N_{RRH}=$number of RRHs, RRH r comprises a group of antenna ports, and r= 1, . . . , $N_{RRH}$. The BS further includes a transceiver operably connected to the processor. The transceiver is configured to: transmit the information about the DL transmission, and transmit the DL transmission; wherein the DL transmission is based on a scheme that is a combination of a precoding scheme and a diversity scheme, wherein the precoding scheme corresponds to applying an intra-RRH precoder component to antenna ports within an RRH, and wherein the diversity scheme corresponds to applying an inter-RRH diversity component to antenna ports across RRHs.

In yet another embodiment, a method for operating a UE is provided. The method comprises: receiving information about a DL transmission transmitted from $N_{RRH}>1$ RRHs, wherein: $N_{RRH}=$number of RRHs, RRH r comprises a group of antenna ports, and r=1, . . . , $N_{RRH}$; receiving the DL transmission; and decoding the information about the DL transmission; wherein the DL transmission is based on a scheme that is a combination of a precoding scheme and a diversity scheme, wherein the precoding scheme corresponds to applying an intra-RRH precoder component to antenna ports within an RRH, and wherein the diversity scheme corresponds to applying an inter-RRH diversity component to antenna ports across RRHs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
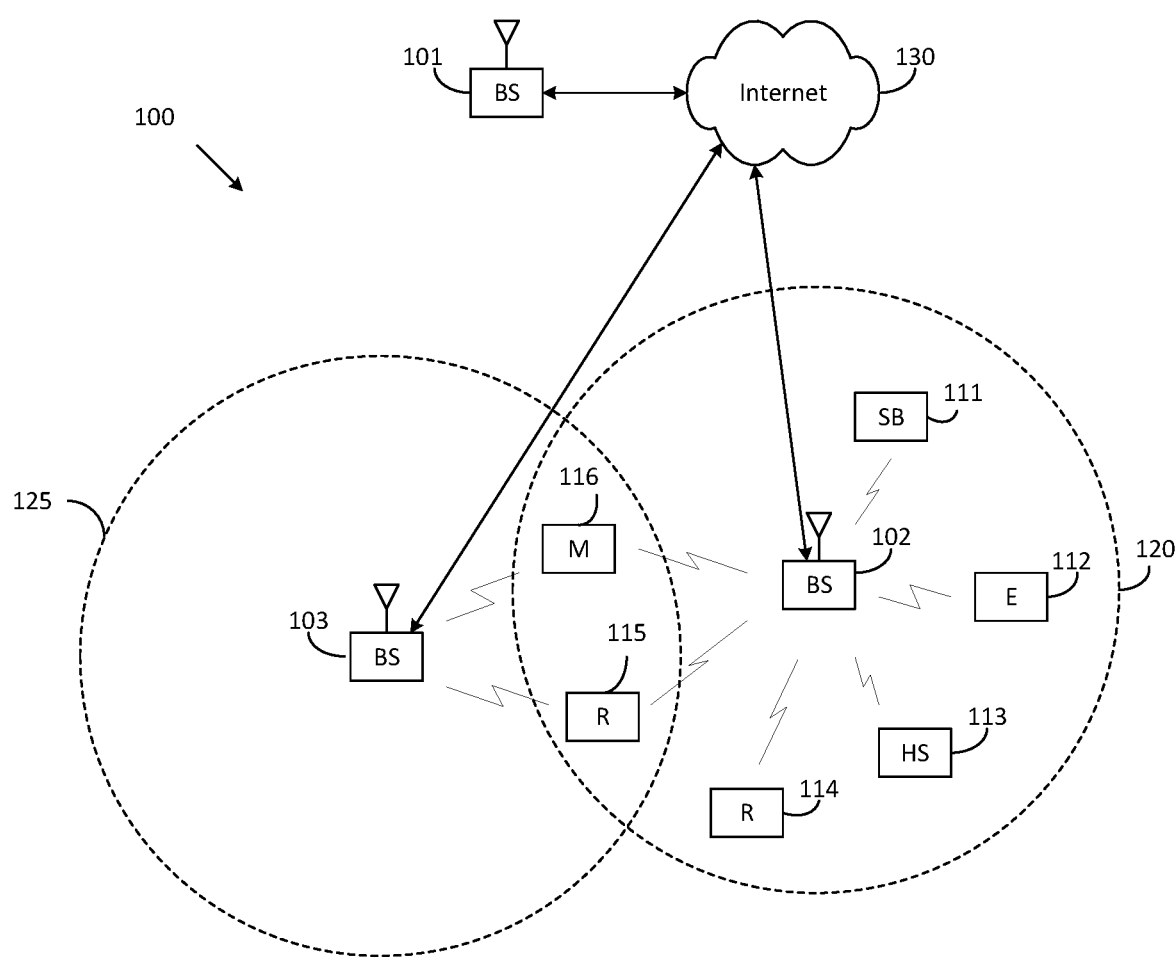
FIG. 1 illustrates an example wireless network according to embodiments of the present disclosure.

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.6.0, "E-UTRA, Physical channels and modulation" (herein "REF 1"); 3GPP TS 36.212 v16.6.0, "E-UTRA, Multiplexing and Channel coding" (herein "REF 2"); 3GPP TS 36.213 v16.6.0, "E-UTRA, Physical Layer Procedures" (herein "REF 3"); 3GPP TS 36.321 v16.6.0, "E-UTRA, Medium Access Control (MAC) protocol specification" (herein "REF 4"); 3GPP TS 36.331 v16.6.0, "E-UTRA, Radio Resource Control (RRC) protocol specification" (herein "REF 5"); 3GPP TR 22.891 v14.2.0 (herein "REF 6"); 3GPP TS 38.212 v16.6.0, "E-UTRA, NR, Multiplexing and channel coding" (herein "REF 7"); and 3GPP TS 38.214 v16.6.0, "E-UTRA, NR, Physical layer procedures for data" (herein "REF 8").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
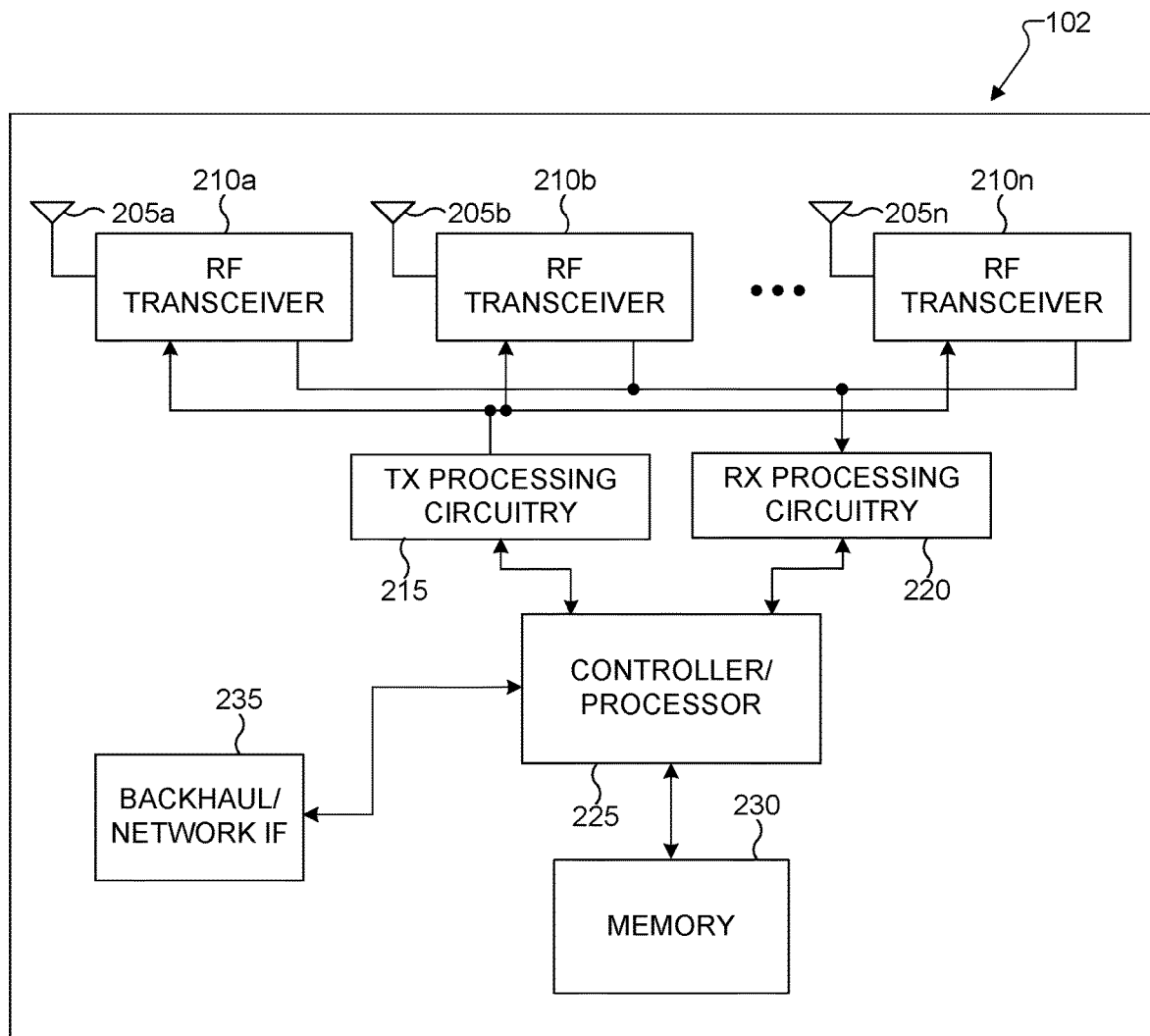
FIG. 2 illustrates an example gNB according to embodiments of the present disclosure.
Figure 3:
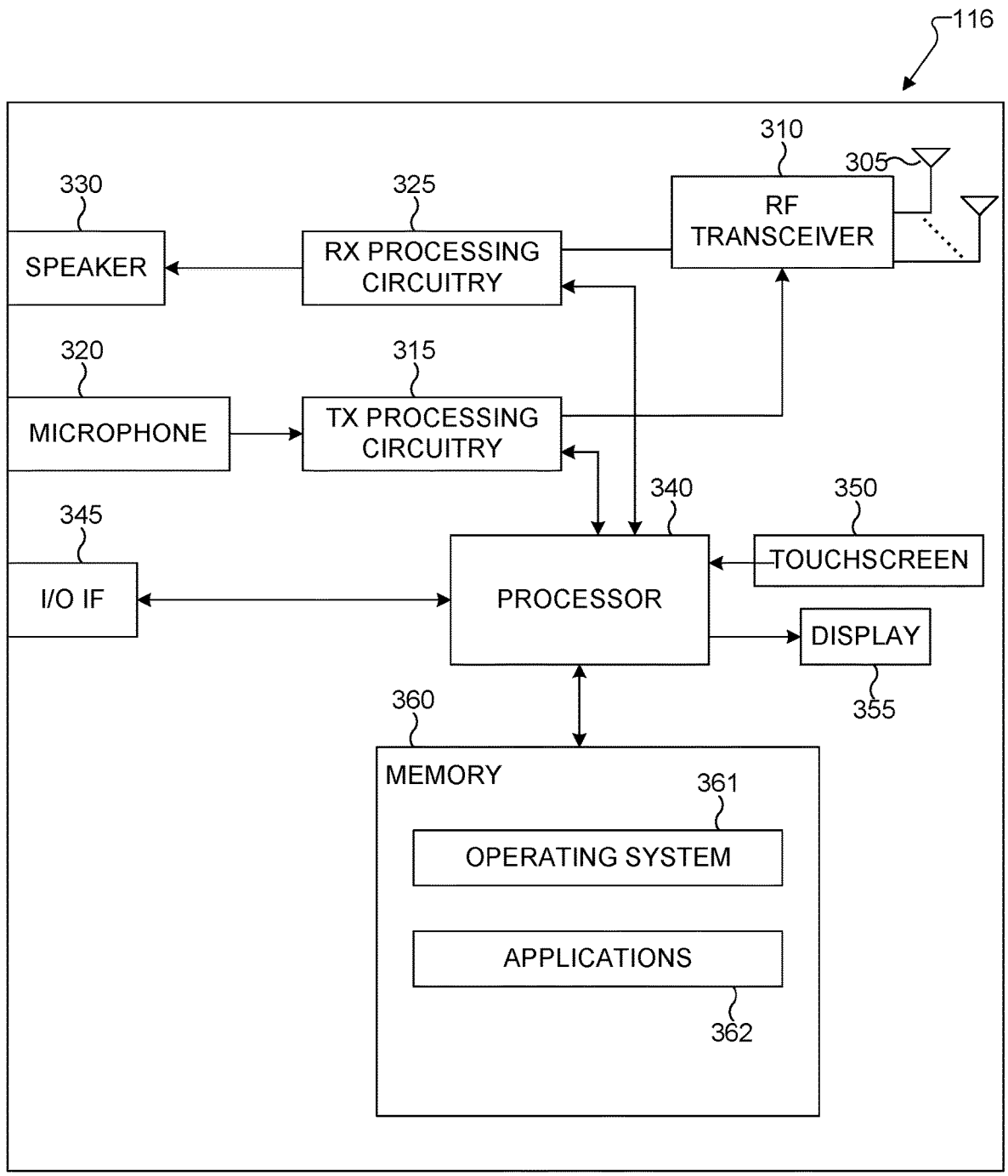
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for receiving information about a downlink (DL) transmission transmitted from $N_{RRH}>1$ RRHs, wherein: $N_{RRH}=$number of remote radio heads (RRHs), RRH r comprises a group of antenna ports, and r=1, . . . , $N_{RRH}$; receiving the DL transmission; and decoding the information about the DL transmission; wherein the DL transmission is based on a scheme that is a combination of a precoding scheme and a diversity scheme, wherein the precoding scheme corresponds to applying an intra-RRH precoder component to antenna ports within an RRH, and wherein the diversity scheme corresponds to applying an inter-RRH diversity component to antenna ports across RRHs. One or more of the gNBs 101-103 includes circuitry, programing, or a combination thereof, for generating information about a downlink (DL) transmission transmitted from $N_{RRH}>1$ RRHs, wherein: $N_{RRH}=$number of remote radio heads (RRHs), RRH r comprises a group of antenna ports, and r=1, . . . , $N_{RRH}$; transmitting the information about the DL transmission, and transmitting the DL transmission; wherein the DL transmission is based on a scheme that is a combination of a precoding scheme and a diversity scheme, wherein the precoding scheme corresponds to applying an intra-RRH precoder component to antenna ports within an RRH, and wherein the diversity scheme corresponds to applying an inter-RRH diversity component to antenna ports across RRHs.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving information about a downlink (DL) transmission transmitted from $N_{RRH}>1$ RRHs, wherein: $N_{RRH}$=number of remote radio heads (RRHs), RRH r comprises a group of antenna ports, and r=1, . . . , $N_{RRH}$; receiving the DL transmission; and decoding the information about the DL transmission; wherein the DL transmission is based on a scheme that is a combination of a precoding scheme and a diversity scheme, wherein the precoding scheme corresponds to applying an intra-RRH precoder component to antenna ports within an RRH, and wherein the diversity scheme corresponds to applying an inter-RRH diversity component to antenna ports across RRHs. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
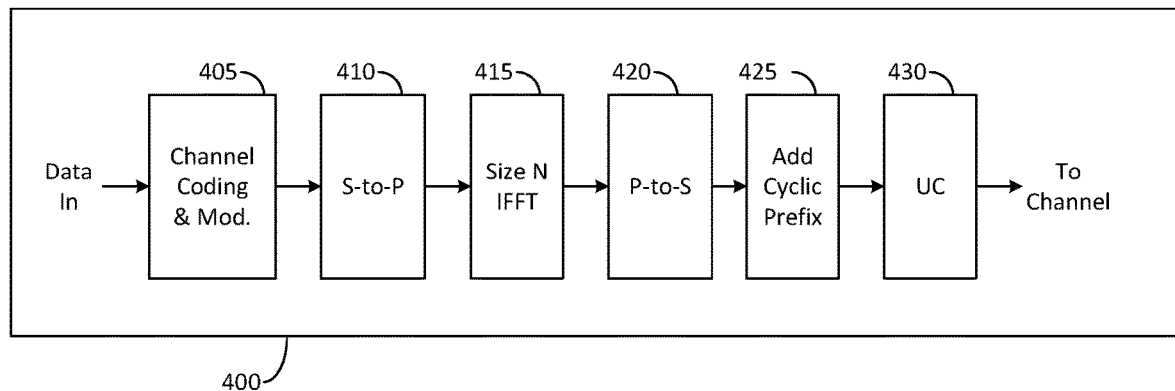
FIG. 4A illustrates a high-level diagram of an orthogonal frequency division multiple access transmit path according to embodiments of the present disclosure.
Figure 4B:
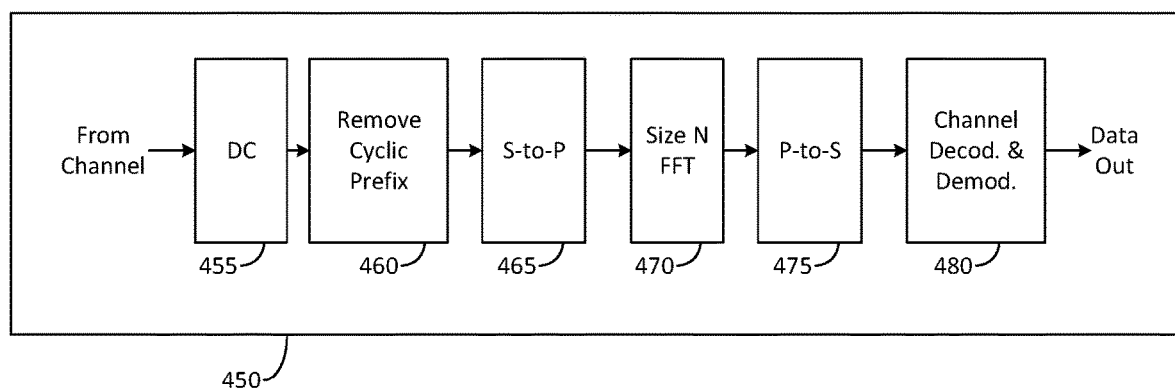
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460, and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe (or slot) includes two slots. Each slot includes $N_{symb1}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
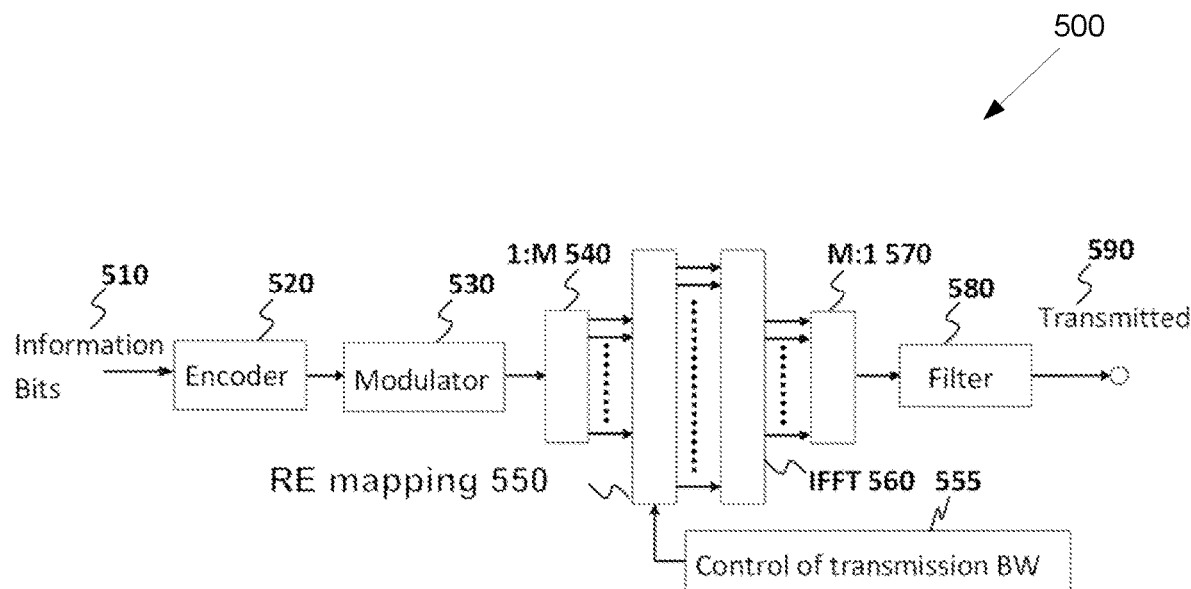
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
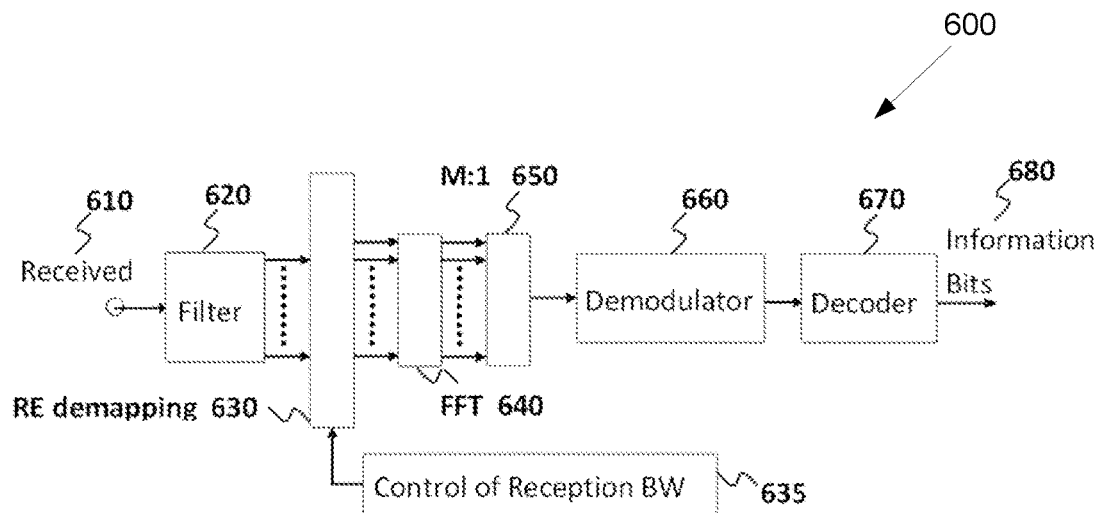
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
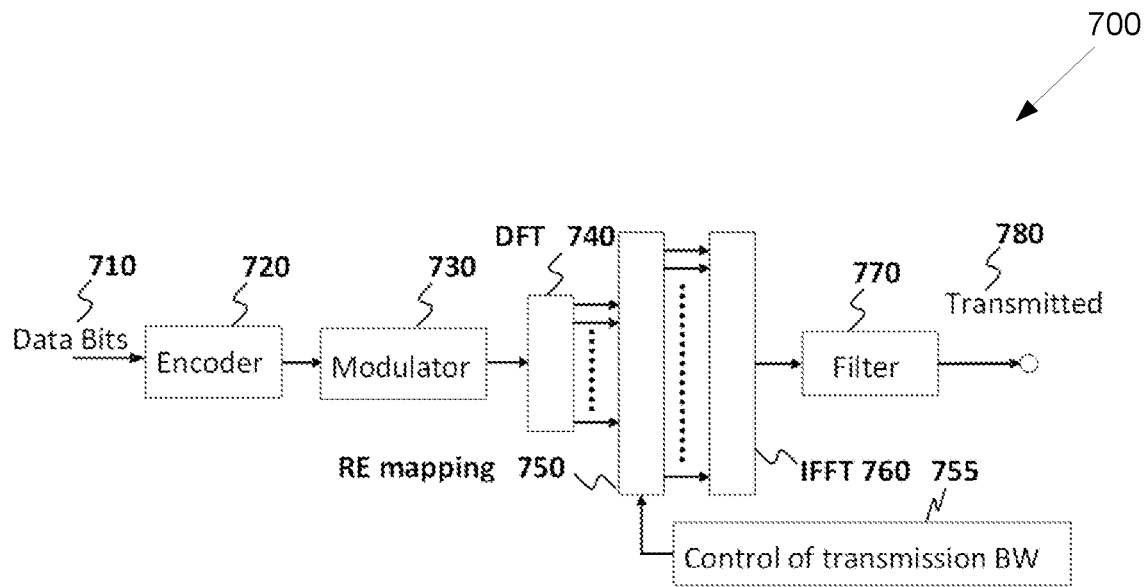
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
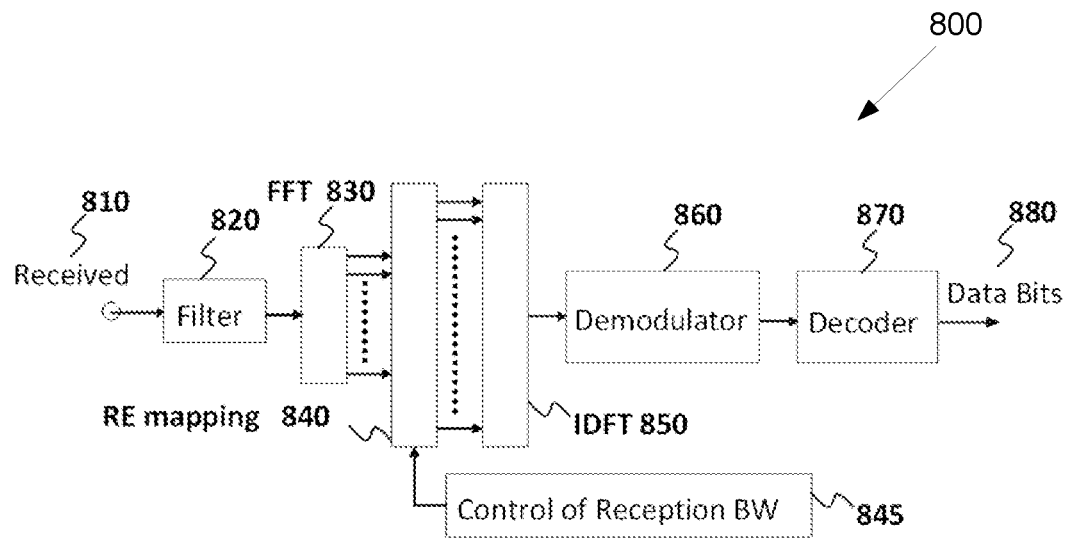
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

Figure 9:
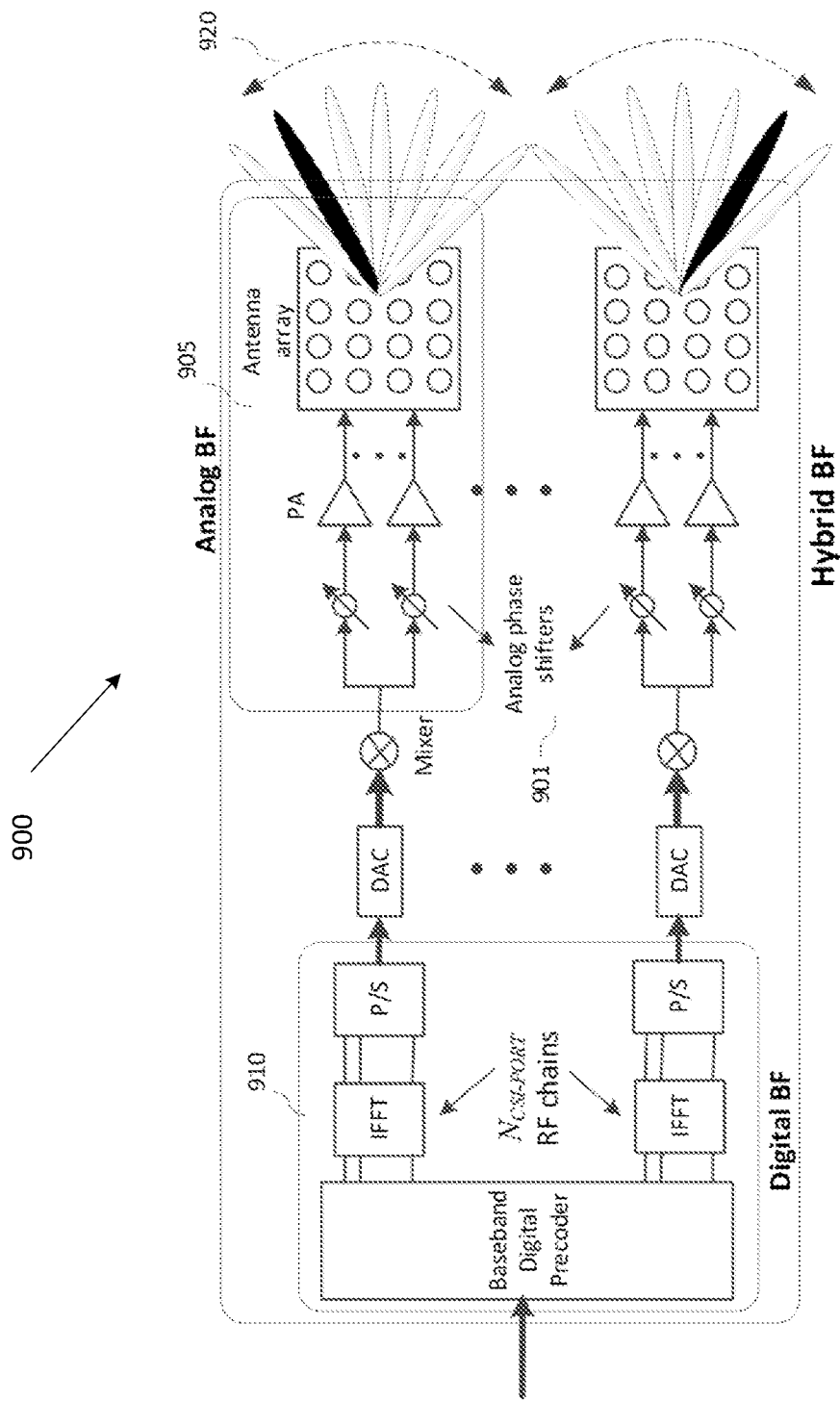
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI\text{-}PORT}$. A digital beamforming unit 910 performs a linear combination across $N_{CSI\text{-}PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanisms corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In a wireless communication system, MIMO is often identified as an essential feature in order to achieve high system throughput requirements. One of the key components of a MIMO transmission scheme is the accurate CSI acquisition at the eNB (or gNB) (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB (or gNB), and CSI acquisition and feedback from UE. In legacy FDD systems, the CSI feedback framework is 'implicit' in the form of CQI/PMI/RI (also CRI and LI) derived from a codebook assuming SU transmission from eNB (or gNB). Because of the inherent SU assumption while deriving CSI, this implicit CSI feedback is inadequate for MU transmission. Since future (e.g., NR) systems are likely to be more MU-centric, this SU-MU CSI mismatch will be a bottleneck in achieving high MU performance gains. Another issue with implicit feedback is the scalability with larger number of antenna ports at eNB (or gNB). For large number of antenna ports, the codebook design for implicit feedback is quite complicated (for example, a total number of 44 Class A codebooks in the 3GPP LTE specification), and the designed codebook is not guaranteed to bring justifiable performance benefits in practical deployment scenarios (for example, only a small percentage gain can be shown at the most). Realizing aforementioned issues, the 3GPP specification also supports advanced CSI reporting in LTE.

In 5G or NR systems [REF7, REF8], the above-mentioned "implicit" CSI reporting paradigm from LTE is also supported and referred to as Type I CSI reporting. In addition, a high-resolution CSI reporting, referred to as Type II CSI reporting, is also supported to provide more accurate CSI information to gNB for use cases such as high-order MU-MIMO. However, the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF8), wherein the DFT-based SD basis in $W_1$ is replaced with SD CSI-RS port selection, i.e., L out of $P_{CSI-RS}/2$ CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

Figure 10:
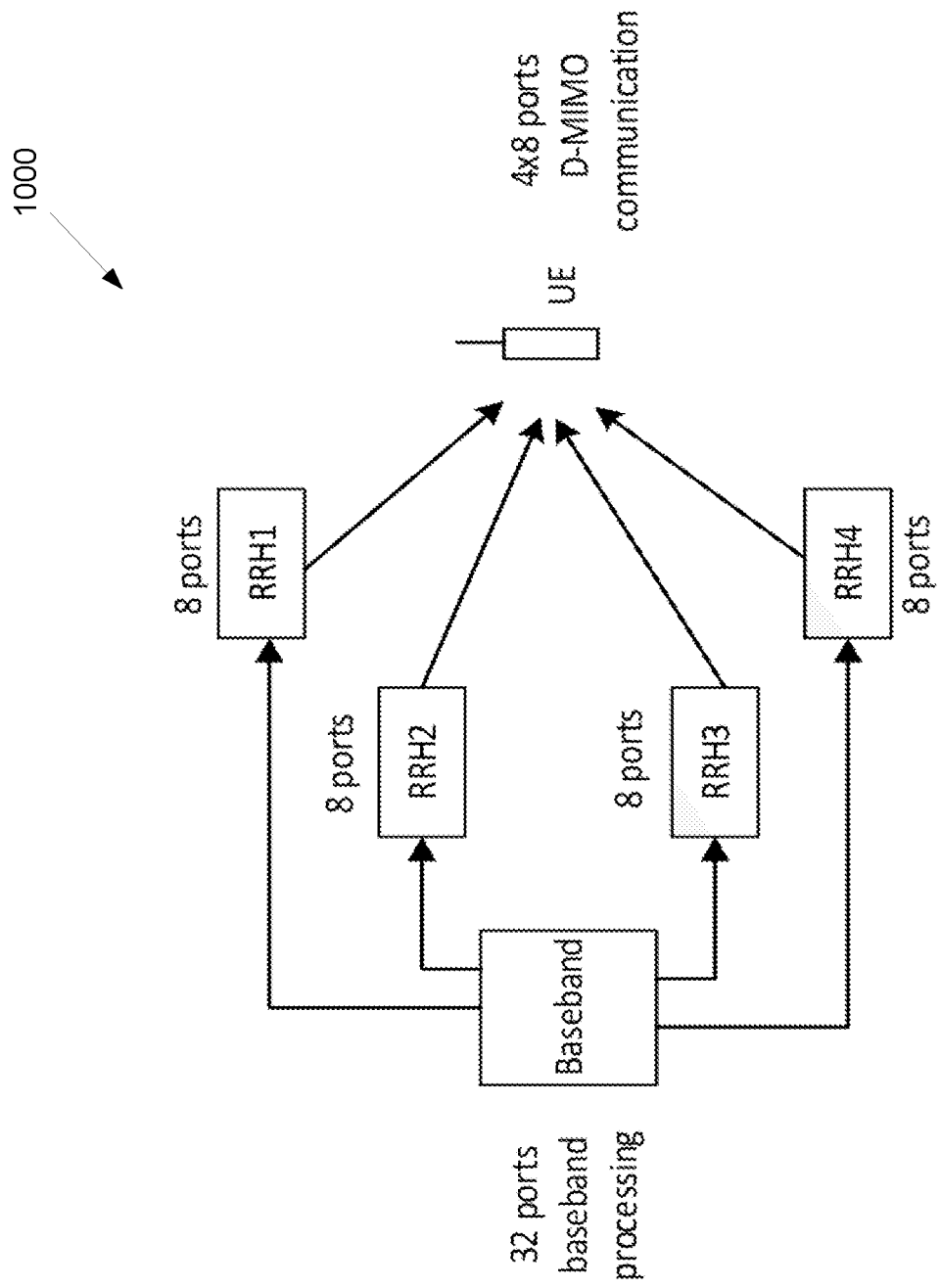
FIG. 10 illustrates an example distributed MIMO (D-MIMO) system according to embodiments of the present disclosure.

FIG. 10 illustrates an example distributed MIMO (D-MIMO) system 1000 according to embodiments of the present disclosure. The embodiment of the distributed MIMO (D-MIMO) system 1000 illustrated in FIG. 10 is for illustration only. FIG. 10 does not limit the scope of this disclosure to any particular implementation of the distributed MIMO (D-MIMO) system 1000.

NR supports up to 32 CSI-RS antenna ports. For a cellular system operating in a sub-1 GHz frequency range (e.g., less than 1 GHz), supporting a large number of CSI-RS antenna ports (e.g., 32) at one site or remote radio head (RRH) is challenging due to larger antenna form factors at these frequencies (when compared with a system operating at a higher frequency such as 2 GHz or 4 GHz). At such low frequencies, the maximum number of CSI-RS antenna ports that can be co-located at a site (or RRH) can be limited, for example to 8. This limits the spectral efficiency of such systems. In particular, the MU-MIMO spatial multiplexing gains offered due to large number of CSI-RS antenna ports (such as 32) can't be achieved. One way to operate a sub-1 GHz system with large number of CSI-RS antenna ports is based on distributing antenna ports at multiple sites (or RRHs). The multiple sites or RRHs can still be connected to a single (common) baseband unit, hence the signal transmitted/received via multiple distributed RRHs can still be processed at a centralized location. For example, 32 CSI-RS ports can be distributed across 4 RRHs, each with 8 antenna ports. Such a MIMO system can be referred to as a distributed MIMO (D-MIMO) system as illustrated in FIG. 10.

The multiple RRHs in a D-MIMO setup can be utilized for diversity gain. Since RRHs are geographically separated, they (RRHs) tend to be uncorrelated. However, the antennas in one RRH tend to be correlated. This motivates a hybrid transmission scheme wherein a diversity scheme is used across RRHs (inter-RRH), and a PMI-based precoding scheme is used across antenna ports within each RRH (intra-RRH). Such a hybrid scheme can be used for enhanced control signaling on PDCCH or enhanced data transmission on PDSCH. This disclosure presents a few examples of pre-coder cycling based diversity scheme for the inter-RRH component of the hybrid transmission scheme.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 11:
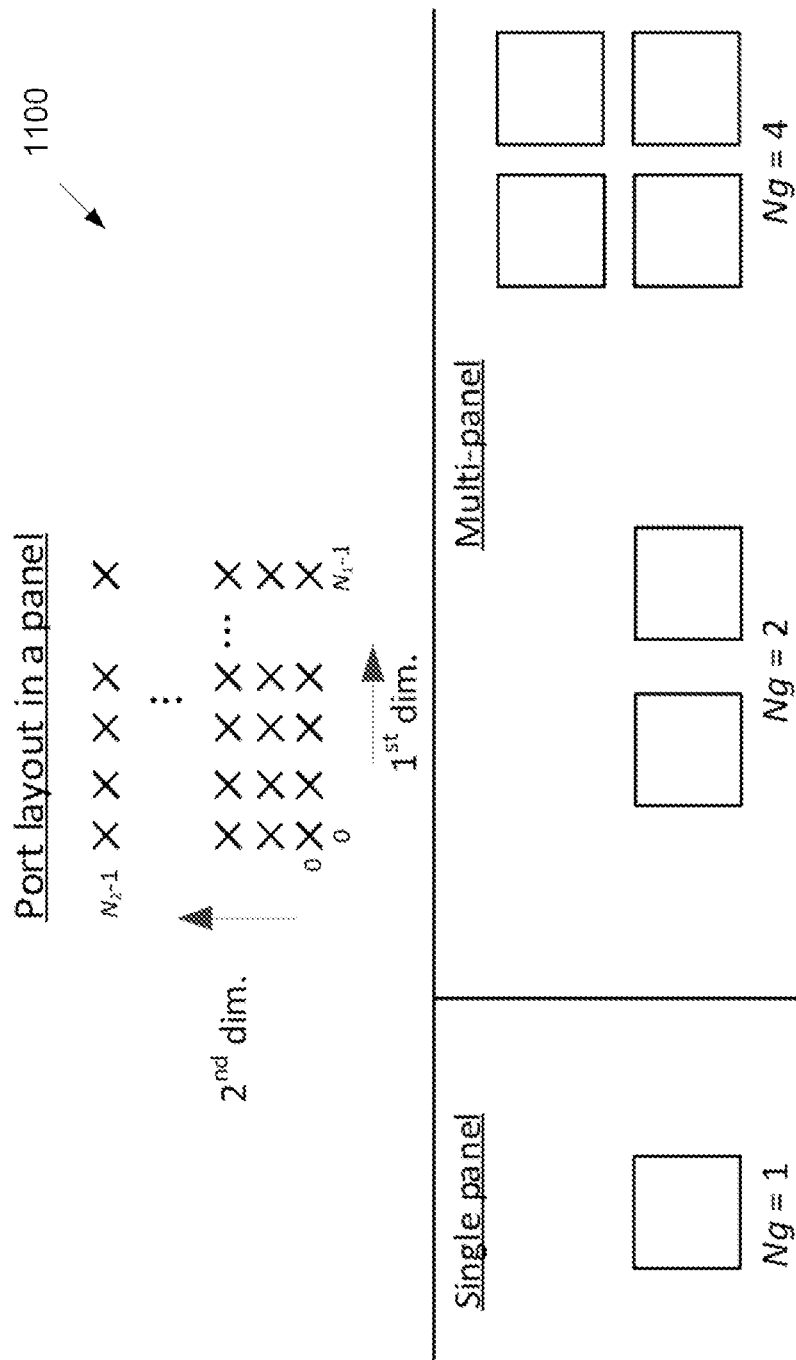
FIG. 11 illustrates an example antenna port layout according to embodiments of the present disclosure.

FIG. 11 illustrates an example antenna port layout 1100 according to embodiments of the present disclosure. The embodiment of the antenna port layout 1100 illustrated in FIG. 11 is for illustration only. FIG. 11 does not limit the scope of this disclosure to any particular implementation of the antenna port layout 1100.

As illustrated in FIG. 11, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$ when each antenna maps to an antenna port. An illustration is shown in FIG. 11 where "X" represents two antenna polarizations. In this disclosure, the term "polarization" refers to a group of antenna ports. For example, antenna ports $$j = X + 0, X + 1, \ldots, X + \frac{P_{CSIRS}}{2} - 1$$

comprise a first antenna polarization, and antenna ports $$j = X + \frac{P_{CSIRS}}{2}, X + \frac{P_{CSIRS}}{2} + 1, \ldots, X + P_{CSIRS} - 1$$

comprise a second antenna polarization, where $P_{CSIRS}$ is a number of CSI-Rs antenna ports and X is a starting antenna port number (e.g., X=3000, then antenna ports are 3000, 3001, 3002, . . . ).

Let $N_g$ be a number of antenna panels at the gNB. When there are multiple antenna panels ($N_g>1$), we assume that each panel is dual-polarized antenna ports with $N_1$ and $N_2$ ports in two dimensions. This is illustrated in FIG. 11. Note that the antenna port layouts may or may not be the same in different antenna panels.

In one example, the antenna architecture of a D-MIMO system is structured. For example, the antenna structure at each RRH is dual-polarized (single or multi-panel) as shown in FIG. 11. The antenna structure at each RRH can be the same. Alternatively, the antenna structure at an RRH can be different from another RRH. Likewise, the number of ports at each RRH can be the same. Alternatively, the number of ports of one RRH can be different from another RRH. In one example, $N_g=N_{RRH}$, a number of RRHs in the D-MIMO transmission.

In another example, the antenna architecture of a D-MIMO system is unstructured. For example, the antenna structure at one RRH can be different from another RRH.

We assume a structured antenna architecture in this disclosure. For simplicity, we assume each RRH is equivalent to a panel (cf. FIG. 11), although, an RRH can have multiple panels in practice. The disclosure however is not restrictive to a single panel assumption at each RRH, and can easily be extended (covers) the case when an RRH has multiple antenna panels.

Figure 12:
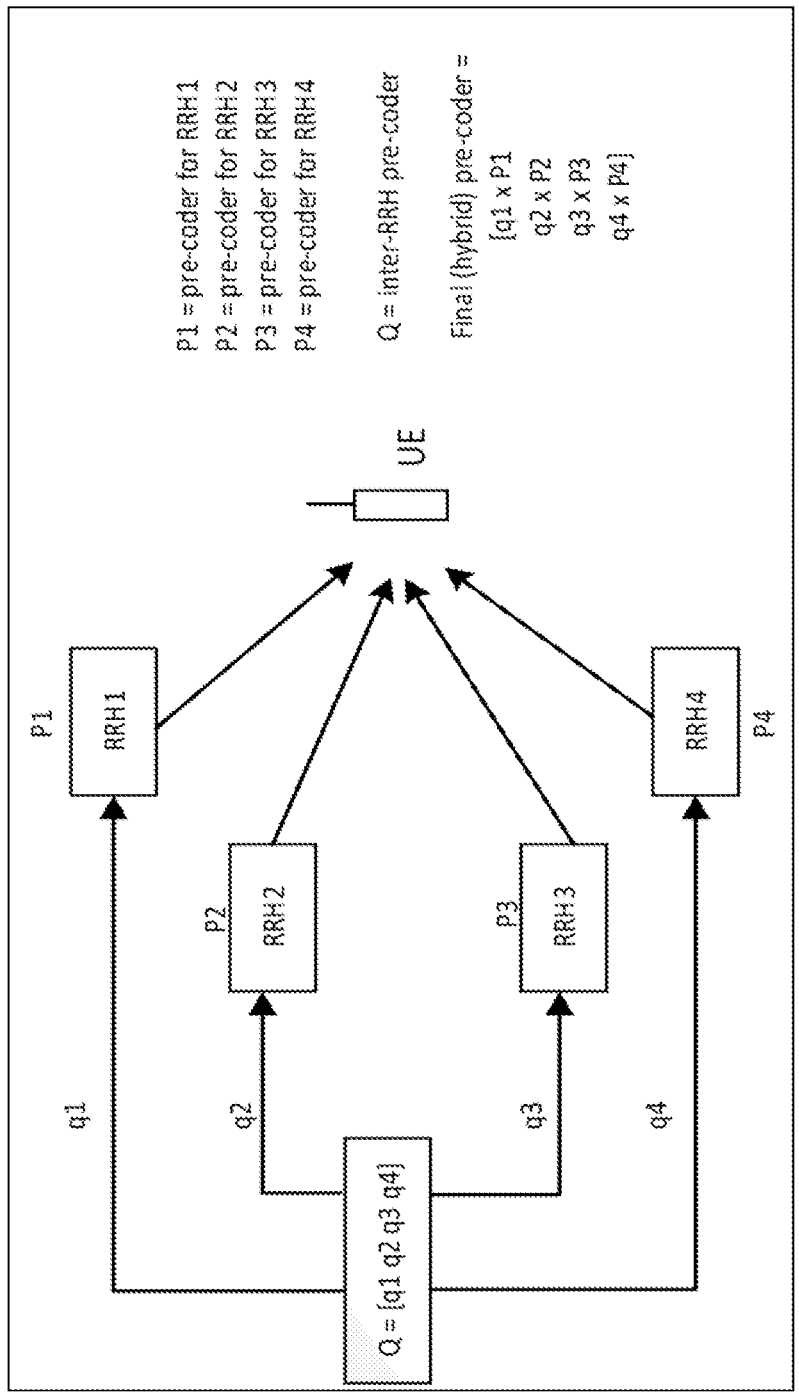
FIG. 12 illustrates an example of a hybrid precoder for a D-MIMO system.

FIG. 12 illustrates an example of a DL transmission scheme for D-MIMO 1200 where the DL transmission scheme is according to embodiments of the present disclosure. The embodiment of the D-MIMO 1200 illustrated in FIG. 12 is for illustration only. FIG. 12 does not limit the scope of this disclosure to any particular implementation of the example D-MIMO 1200.

In one embodiment I.1, a UE is configured with a hybrid transmission scheme based on a hybrid pre-coder (for each layer), wherein the (hybrid) pre-coder is given by $$W = R \times Q = \begin{bmatrix} P_1 & 0 & 0 & 0 \\ 0 & P_2 & 0 & 0 \\ 0 & 0 & \ddots & 0 \\ 0 & 0 & 0 & P_{N_{RRH}} \end{bmatrix} \times \begin{bmatrix} q_1 \\ q_2 \\ \vdots \\ q_{N_{RRH}} \end{bmatrix} = \begin{bmatrix} q_1 \times P_1 \\ q_2 \times P_2 \\ \vdots \\ q_{N_{RRH}} \times P_{N_{RRH}} \end{bmatrix},$$

$$\text{Where } R = \begin{bmatrix} P_1 & 0 & 0 & 0 \\ 0 & P_2 & 0 & 0 \\ 0 & 0 & \ddots & 0 \\ 0 & 0 & 0 & P_{N_{RRH}} \end{bmatrix}$$

is a block diagonal matrix comprising $N_{RRH}$ blocks, the r-th block $P_r$ is a (intra-RRH) pre-coding vector for the r-th RRH, and $$Q = \begin{bmatrix} q_1 \\ q_2 \\ \vdots \\ q_{N_{RRH}} \end{bmatrix}$$

is an inter-RRH pre-coding vector across $N_{RRH}$ RRHs. This is illustrated in FIG. 12.

In one example, $$W = \frac{1}{t} R \times Q,$$

where t is a normalization factor that normalizes W to a fixed number, e.g., $$\frac{1}{\sqrt{v}} \text{ or } \frac{1}{\sqrt{v} \times norm(R \times Q)}$$

and ν is rank (number of layers) value, and norm(Y) is the Euclidean norm of a length-$n_Y$ vector Y, i.e., $$\mathrm{norm}(Y) = \sqrt{\sum_{i=0}^{n_Y-1} y_i^2}.$$

In one example, the rank value is fixed, e.g., ν=1. In one example, the rank value is configured to the UE, e.g., from {1, 2}. In one example, the rank value is reported by the UE, e.g., as part of the CSI report, from the set of supported or allowed rank values. The set of supported or allowed rank valued can be configured via higher layer RRC signaling. For example, rank restriction (RI-restriction) can be used for this configuration.

In one example I.1.1, for rank>1 (i.e., when ν>1), the (hybrid) pre-coder for layer l∈{1, ..., ν} can be expressed as $W^l = R_l \times Q_l$, where $R_l$ and $Q_l$ are according to at least one of the following examples:

In one example I.1.1.1, $R_l$ is layer-common (i.e., $R_l$=R for all l) and $Q_l$ is layer-specific (i.e., $Q_1, Q_2, \ldots$, one for each layer).

In one example 1.1.1.2, $R_l$ is layer-specific (i.e., $R_1, R_2, \ldots$, one for each layer) and $Q_l$ is layer-common (i.e., $Q_l$=Q for all l).

In one example 1.1.1.3, $R_l$ is layer-specific (i.e., $R_1, R_2, \ldots$, one for each layer) and $Q_l$ is layer-specific (i.e., $Q_1, Q_2, \ldots$, one for each layer).

When a component X is layer-common, then one X is used that is common for all layer values. And, when a component X is layer-specific, then one X is used that is each layer.

In one example 1.1.2, for a set of PRBs in a time slot, allocated or scheduled for data (PDSCH) or/and control (PDCCH), the hybrid pre-coder W is used/determined such that a cycling operation is performed across the set of PRBs, wherein the cycling operation is according to at least one of the following examples.

In one example 1.1.2.1, the cycling is performed for the inter-RRH component (Q). That is, multiple values ($Q_1, Q_2, \ldots$ etc.) for the inter-RRH component (Q) are cycled through the set of PRBs. The gNB/NW is free to use any intra-RRH component (R).

In one example 1.1.2.2, the cycling is performed for the intra-RRH component (R). That is, multiple values ($R_1, R_2, \ldots$ etc.) for the intra-RRH component (R) are cycled through the set of PRBs. The gNB/NW is free to use any inter-RRH component (Q).

In one example 1.1.2.3, the cycling is performed for both the inter-RRH component (Q) and the intra-RRH component (R). That is, multiple values ($Q_1, Q_2, \ldots$ etc.) for the inter-RRH component (Q) and multiple values ($R_1, R_2, \ldots$ etc.) for the intra-RRH component (R) are cycled through the set of PRBs.

In the rest of the disclosure, example I.1.2.1 is assumed for the cycling operation.

In one embodiment II.1, the inter-RRH pre-coding vector Q is a selection vector that selects one out of $N_{RRH}$ RRHs, i.e., $$Q = e_r^{N_{RRH}}$$

where $e_i^I$ is a I-element selection vector containing non-zero value (e.g., a value of 1) in element i and zeros elsewhere.

Figure 13:
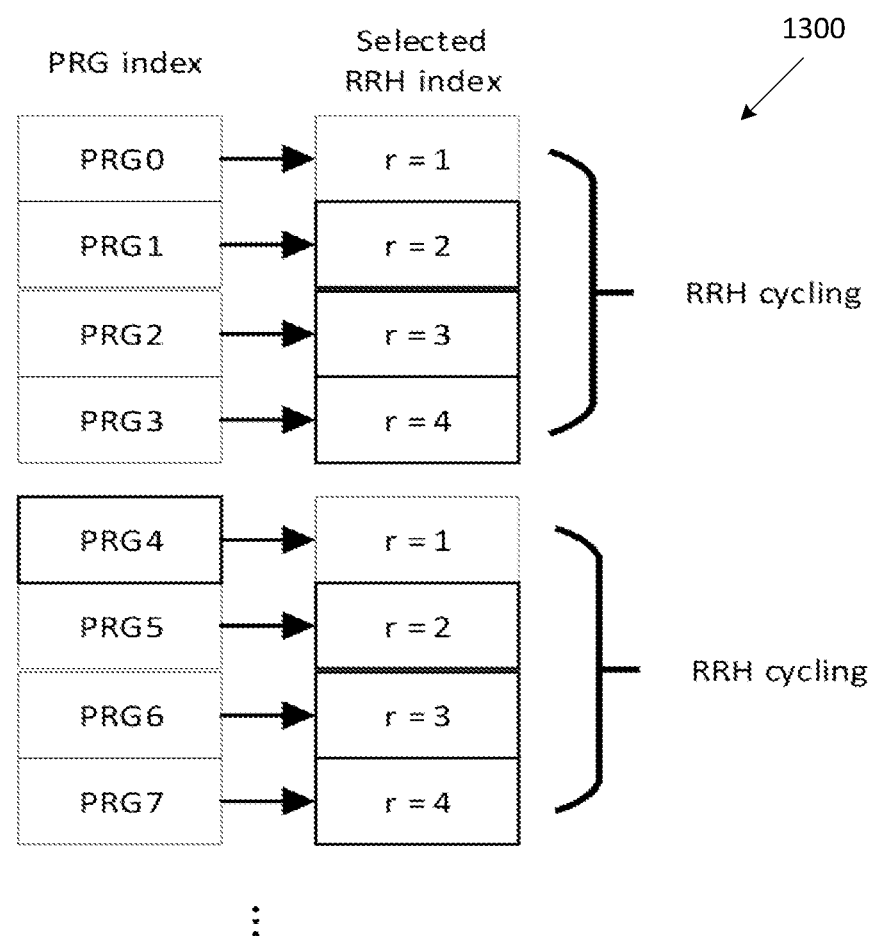
FIG. 13 illustrates an example of RRH cycling according to embodiments of the present disclosure.

FIG. 13 illustrates an example of RRH cycling 1300 according to embodiments of the present disclosure. The embodiment of the example of RRH cycling 1300 illustrated in FIG. 13 is for illustration only. FIG. 13 does not limit the scope of this disclosure to any particular implementation of the example of RRH cycling 1300.

The inter-RRH pre-coder Q is used/selected such that the pre-coder cycling is performed across RRHs. As illustrated in FIG. 13, four RRHs are cycled through PRGs and the cycling pattern corresponds to RRH index r cycling in the following order 1, 2, 3, 4. Hence, the pre-coding vector Q is cycled through PRGs as follows:

$Q = e_1^{N_{RRH}} = [1\ 0\ 0\ 0]^T$: PRG0, PRG4, ...
$Q = e_2^{N_{RRH}} = [0\ 1\ 0\ 0]^T$: PRG1, PRG5, ...
$Q = e_3^{B_{RRH}} = [0\ 0\ 1\ 0]^T$: PRG2, PRG6, ...
$Q = e_4^{N_{RRH}} = [0\ 0\ 0\ 1]^T$: PRG3, PRG7, ...

In general, $Q = e_r^{N_{RRH}}$ is used at PRG index (4*n+r−1) where n=0, 1, 2, . . . .

In one example, the cycling is performed through all $N_{RRH}$ RRHs. In another example, the cycling is performed through a subset of $N_{RRH}$ RRHs, wherein the subset can be fixed, or the subset can be configured, e.g., via higher layer RRC signaling, or the subset can be determined based on a UE recommendation, where the UE recommendation can be a part of the CSI report (e.g., PMI can include a component indicating the subset of RRHs for cycling).

In one example II.1.1, the cycling of the inter-RRH pre-coding vector Q is performed across time-frequency (T-F) resources according to at least one of the following examples.

In one example II.1.1.1, the cycling of the inter-RRH pre-coding vector Q is performed across PRGs (in a per PRG manner), i.e., the inter-RRH pre-coding vector Q changes (is cycled) from one PRG to another. In one example, the PRG size (in terms of number of PRBs) is fixed, e.g., to 2 or 4. In one example, the PRG size is configured by the higher layer parameter, e.g., pdsch-BundleSizeForCSI. In one example, the PRG size is the same as that for CQI calculation. In one example, the PRG size is the same as that for PDSCH (or DMRS for PDSCH). In one example, the PRG size is the same as that for PDCCH (or DMRS for PDCCH).

In one example II.1.1.2, the cycling of the inter-RRH pre-coding vector Q is performed across PRBs (in a per PRB manner), i.e., the inter-RRH pre-coding vector Q changes (is cycled) from one PRB to another.

In one example II.1.1.3, the cycling of the inter-RRH pre-coding vector Q is performed across SBs (in a per SB manner), i.e., the inter-RRH pre-coding vector Q changes (is cycled) from one SB to another. In one example, the SB size (in terms of number of PRBs) is fixed, e.g., to 4. In one example, the SB size is configured by the higher layer parameter, e.g., sub-bandSize. In one example, the SB size is the same as that for CQI calculation. In one example, the SB size is the same as that for PDSCH (or DMRS for PDSCH). In one example, the SB size is the same as that for PDCCH (or DMRS for PDCCH).

In one example II.1.1.4, the cycling of the inter-RRH pre-coding vector Q is performed across FD units (in a per FD unit manner), i.e., the inter-RRH pre-coding vector Q changes (is cycled) from one FD unit to another. In one example, the FD unit size is $N_{SB}$/R where $N_{SB}$ is a number of SBs and R is fixed (e.g., 1 or 2) or configured via configured with the higher-layer parameter, e.g., numberOfPMISubbandsPerCQISubband-r16.

In one example II.1.1.5, the cycling of the inter-RRH pre-coding vector Q is performed across sub-RBs, wherein a sub-RB is defined as a subset of REs comprising a PRB. The details about the sub-RB level pre-coder cycling can be according to the U.S. Pat. No. 10,075,218 issued on 11 Sep. 2018 incorporated by reference herein.

In one example II.1.2, the RRH cycling pattern (or sequence) is according to at least one of the following examples.

In one example II.1.2.1, the RRH cycling pattern (or sequence) is fixed or deterministic. For example, 1, 2, 3, In one example II.1.2.2, the RRH cycling pattern (or sequence) is transparent to the UE, hence is not known to the UE and the gNB (NW) is free to use ant cycling pattern.

In one example II.1.2.3, the RRH cycling pattern (or sequence) is configured to the UE, for example, via higher layer (RRC) signaling.

In one example II.1.2.4, the RRH cycling pattern (or sequence) is reported from the UE, for example, as part of the CSI report (e.g., PMI can include a component indicating the RRH cycling pattern).

In one embodiment III.1, the inter-RRH pre-coding vector Q is a combination (product) of a selection vector and a pre-coding vector, where the selection vector selects n out of $N_{RRH}$ RRHs and the pre-coding vector for the selected n RRHs, i.e., $$Q = S_n \times U_n = \begin{bmatrix} e_{r_1}^{N_{RRH}} & e_{r_2}^{N_{RRH}} & \ldots & e_{r_n}^{N_{RRH}} \end{bmatrix} \times U_n$$

where $1 < n < N_{RRH}$, $(r_1, r_2, \ldots r_n)$ are indices of the selected n RRHs, where $r_j \in \{1, \ldots, N_{RRH}\}$, $e_i^I$ is defined above, and $U_n$ is a size n×1 pre-coding vector for the selected n RRHs.

The inter-RRH pre-coder Q is used/selected such that the pre-coder cycling is performed across RRHs.

In one example III.1.1, the cycling of the inter-RRH pre-coder Q is according to at least one of the following examples.

In one example III.1.1.1, the cycling is performed for the selection matrix ($S_n$). That is, multiple values ($S_{n,1}$, $S_{n,2}$, . . . , etc.) for the selection matrix ($S_n$) are cycled. The gNB/NW is free to use any pre-coding vector ($U_n$).

In one example III.1.1.2, the cycling is performed for the pre-coding vector ($U_n$). That is, multiple values ($U_n$ etc.) for the pre-coding vector ($U_n$) are cycled. The gNB/NW is free to use any selection matrix ($S_n$).

In one example III.1.1.3, the cycling is performed for both the selection matrix ($S_n$) and the pre-coding vector ($U_n$). That is, multiple values ($S_{n,1}$, $S_{n,2}$, . . . , etc.) for the selection matrix ($S_n$) and multiple values ($U_{n,1}$, $U_{n,2}$, . . . , etc.) for the pre-coding vector ($U_n$) are cycled.

In the rest of the disclosure, example III.1.1.3 is assumed for the cycling operation.

Figure 14:
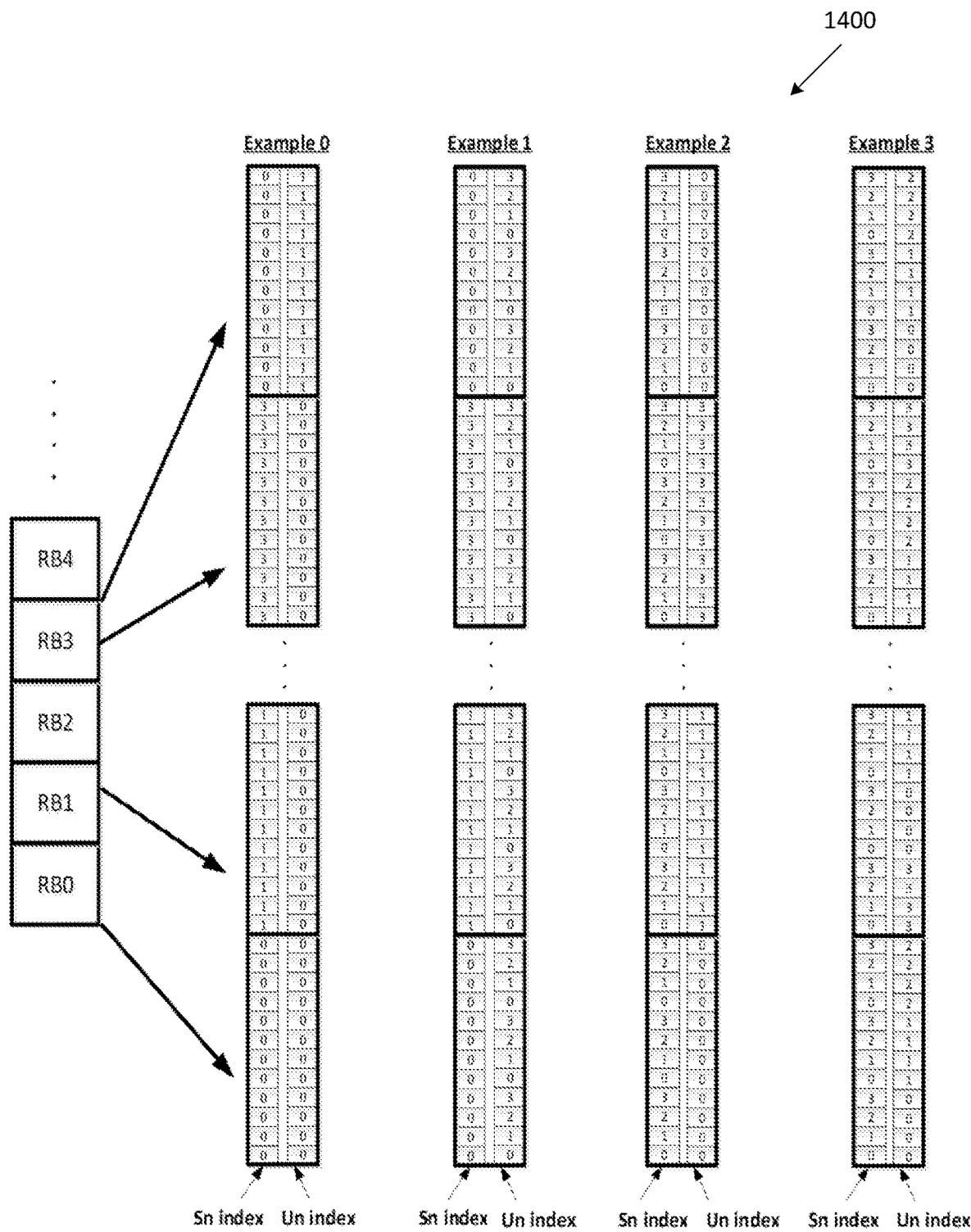
FIG. 14 illustrates an example of a combination of RRH and pre-coder cycling according to embodiments of the present disclosure.

FIG. 14 illustrates an example of a combination of RRH and pre-coder cycling 1400 according to embodiments of the present disclosure. The embodiment of the combination of RRH and pre-coder cycling 1400 illustrated in FIG. 14 is for illustration only. FIG. 14 does not limit the scope of this disclosure to any particular implementation of the combination of RRH and pre-coder cycling 1400.

As illustrated in FIG. 14, four RRH selection matrix ($S_n$) indices and four pre-coding matrix ($U_n$) indices are cycled through PRBs. Four examples of cycling are shown. In one example, for $N_{RRH}=4$ and n=2, the four RRH selection matrices ($S_n$) correspond to $S_2=[e_{r_1}^{N_{RRH}} \ e_{r_2}^{N_{RRH}}]$ where $S_n$ index=0, 1, 2, 3 map to index pair $(r_1, r_2)=(1,2), (2,3), (3,4), (1,4)$, respectively, and four pre-coding matrices ($U_n$) correspond to $U_2=[\phi_1 \ \phi_2]^T$ where $\phi_1=1$ and $U_n$ index=0, 1, 2, 3 maps to phase $\phi_2=1, j, -1, -j$, respectively.

In one example, the cycling is performed through all $N_{RRH}$ RRHs. In another example, the cycling is performed through a subset of $N_{RRH}$ RRHs, wherein the subset can be fixed, or the subset can be configured, e.g., via higher layer RRC signaling, or the subset can be determined based on a UE recommendation, where the UE recommendation can be a part of the CSI report (e.g., PMI can include a component indicating the subset of RRHs for cycling).

In one example III.1.1, the cycling of the inter-RRH pre-coding vector Q is performed across time-frequency (T-F) resources according to at least one of the examples II.1.1.1 through II.1.1.5 in example II.1.1.

In one example 111.1.2, the RRH cycling pattern (or sequence) ($r_1, r_2, r_n$) is according to at least one of the examples II.1.2.1 through II.1.2.4 in example II.1.2.

In one example III.1.3, the value n is determined according to at least one of the following examples.

In one example III.1.3.1, the value n is fixed, e.g., n=2.

In one example III.1.3.2, the value n is determined based on the value $N_{RRH}$, e.g., n=min(t, $N_{RRH}$) where t is fixed, or n=$N_{RRH}/2$.

In one example III.1.3.3, the value n is configured, e.g., vie higher layer (RRC) signaling.

In one example III.1.3.4, the value n is recommended by the UE, e.g., as part of UE capability signaling or as part of the CSI report.

In one example III.1.4, the codebook for the pre-coding vector ($U_n$) is according to at least one of the following examples.

In one example III.1.4.1, the codebook for the pre-coding vector ($U_n$) is based on a PMI codebook for D-MIMO which comprises the pre-coding vectors having the pre-coding structure W=R×Q as explained in embodiment I.1 and shown in FIG. 12.

In one example III.1.4.2, the codebook for the pre-coding vector ($U_n$) is a scalar codebook, wherein each element of $U_n$ is selected/reported separately using a scalar codebook. Alternatively, one of the n elements of $U_n$ is fixed, e.g., to 1, and each of the remaining n−1 elements is selected/reported separately using a scalar codebook, where the location of the fixed element can be fixed (e.g., to 1) or it can be configured (e.g., via RRC) or reported (e.g., as part of the CSI report). The scalar codebook is according to at least one of the following examples.

In one example III.1.4.2.1, the scalar codebook is a phase codebook according to at least one of the following examples.

In one example, the phase codebook corresponds to QPSK alphabet $\varphi_w=e^{j\pi w/2}$ or $\varphi_w=e^{j2\pi w/N_{PSK}}$ where $N_{PSK}=4$ and $w \in \{0, \ldots, 3\}$.

In one example, the phase codebook corresponds to 8PSK alphabet $\varphi_w=e^{j\pi w/4}$ or $\varphi_w=e^{j2\pi w/N_{PSK}}$ where $N_{PSK}=8$ and $w \in \{0, \ldots, 7\}$.

In one example, the phase codebook corresponds to 16PSK alphabet $\varphi_w=e^{j\pi w/8}$ or $\varphi_w=e^{j2\pi w/N_{PSK}}$ where $N_{PSK}=16$ and $w \in \{0, \ldots, 15\}$.

In one example, the phase codebook corresponds to $N_{PSK}$-PSK alphabet $\varphi_w=e^{j2\pi w/N_{PSK}}$ where $w \in \{0, \ldots, N_{PSK}-1\}$ and $N_{PSK}$ is configured, e.g., from $\{4, 8\}$.

In one example III.1.4.2.2, the scalar codebook is a pair of amplitude and phase codebooks, where the phase codebook is according to one of the examples in example III.1.4.2.1, and the phase codebook is according to at least one of the following examples.
In one example, the amplitude codebook is a 1-bit codebook, e.g., $$\left\{1, \frac{1}{\sqrt{2}}\right\}.$$

In one example, the amplitude codebook is a 2-bit codebook, e.g., $$\left\{1, \frac{1}{\sqrt{2}}, \frac{1}{2}, \frac{1}{2\sqrt{2}}\right\} \text{ or } \left\{1, \frac{1}{\sqrt{2}}, \frac{1}{2}, 0\right\}.$$

In one example, the amplitude codebook is a 3-bit codebook, e.g., $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\} \text{ or }$$

$$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, 0\right\}.$$

In one example III.1.4.3, the codebook for the pre-coding vector ($U_n$) is a vector codebook comprising length-n vectors. In one example, the vector codebook is an oversampled DFT codebook comprising n×o DFT vectors $$v_m = \begin{bmatrix} 1 & e^{j\frac{2\pi m}{on}} & \ldots & e^{j\frac{2\pi m(n-1)}{on}} \end{bmatrix}^T$$

where m=0, 1, . . . , on−1 and o is the oversampling factor. In one example, o=1. In one example, o is fixed to o=4. In one example, o is configured from a set of candidate values, e.g., {4, 8}.

In one embodiment IV.1, the inter-RRH pre-coding vector Q is a pre-coding vector for all $N_{RRH}$ RRHs (there is no need for any RRH selection since all RRHs are used in the pre-coding vector), i.e., $$Q = U_{N_{RRH}}$$

where $U_{N_{RRH}}$ is a size $N_{RRH} \times 1$ pre-coding vector all RRHs.

Figure 15:
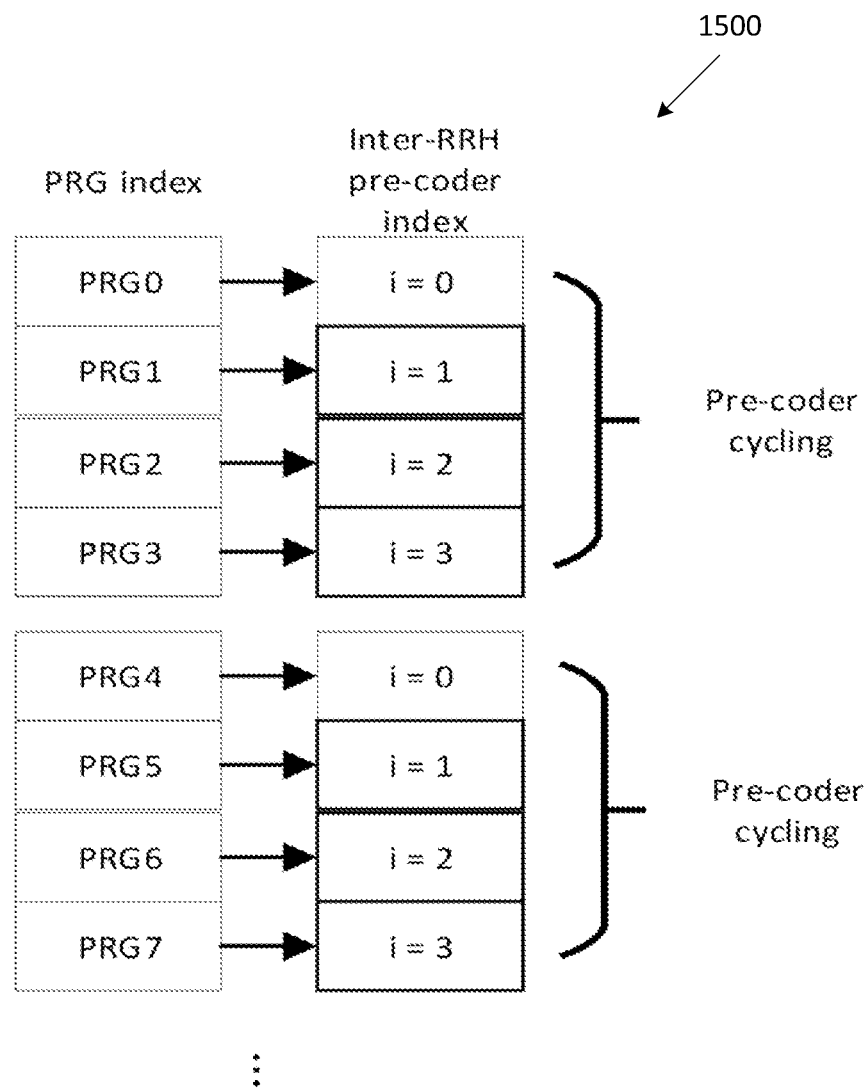
FIG. 15 illustrates an example of pre-coder cycling according to embodiments of the present disclosure.

FIG. 15 illustrates an example of pre-coder cycling 1500 according to embodiments of the present disclosure. The embodiment of the example of pre-coder cycling 1500 illustrated in FIG. 15 is for illustration only. FIG. 15 does not limit the scope of this disclosure to any particular implementation of the example of pre-coder cycling 1500.

The inter-RRH pre-coder Q is used/selected such that the pre-coder cycling is performed across RRHs. As illustrated in FIG. 15, four pre-coding vectors are cycled through PRGs and the cycling pattern corresponds to pre-coding vector index i cycling in the following order 0, 1, 2, 3. Hence, the pre-coding vector Q is cycled through PRGs as follows:

Q=$U_{N_{RRH}}$(i=0): PRG0, PRG4, . . .
Q=$U_{N_{RRH}}$(i=1): PRG1, PRG5, . . .
Q=$U_{N_{RRH}}$(i=2): PRG2, PRG6, . . .
Q=$U_{N_{RRH}}$(i=3): PRG3, PRG7, . . .

In general, Q=$U_{N_{RRH}}$ (i) is used at PRG index (4*n+i) where n=0, 1, 2, . . . .

In one example, the cycling is performed through all $N_{RRH}$ RRHs. In another example, the cycling is performed through a subset of $N_{RRH}$ RRHs, wherein the subset can be fixed, or the subset can be configured, e.g., via higher layer RRC signaling, or the subset can be determined based on a UE recommendation, where the UE recommendation can be a part of the CSI report (e.g., PMI can include a component indicating the subset of RRHs for cycling).

In one example IV.1.1, the cycling of the inter-RRH pre-coding vector Q is performed across time-frequency (T-F) resources according to at least one of the examples II.1.1.1 through II.1.1.5 in example II.1.1.

In one example IV.1.2, the pre-coding vector cycling pattern (or sequence) is according to at least one of the examples II.1.2.1 through II.1.2.4 in example II.1.2.

In one example IV.1.3, the codebook for the pre-coding vector ($U_{N_{RRH}}$) is according to at least one of the examples in example 1II.1.4 except that n is replaced with $N_{RRH}$.

In one embodiment V.1, the value of n in embodiment III.1 can be 1. When n=1, the pre-coder cycling is according to embodiment II.1 and when n>1, the pre-coder cycling is according to embodiment III.1.

In one embodiment V.2, the value of n in embodiment III.1 can be $N_{RRH}$. When n=$N_{RRH}$, the pre-coder cycling is according to embodiment IV.1 and when $N_{RRH}$>n, the pre-coder cycling is according to embodiment III.1.

In one embodiment V.3, the value of n in embodiment III.1 can be 1 or $N_{RRH}$. When n=1, the pre-coder cycling is according to embodiment II.1 and when $N_{RRH}$>n>1, the pre-coder cycling is according to embodiment III.1, and when n=$N_{RRH}$, the pre-coder cycling is according to embodiment IV.1.

In one embodiment V.4, the UE is configured with the pre-coder cycling scheme based on higher layer (RRC) signaling, where the pre-coder cycling scheme can be according to embodiment II.1 or embodiment III.1 or embodiment IV.1.

In one embodiment V.5, the set of all candidate inter-RRH pre-coding vectors Q is determined by the gNB (or NW) based on a CSI feedback, wherein the CSI feedback includes a PMI that is used to determine the set of all candidate inter-RRH pre-coding vectors. In one example, the PMI corresponds to i1 (indicating WB PMI component as in R15 Type I codebook). In one example, the PMI corresponds to i1 and i2 (indicating SB PMI component as in R15 Type I codebook). In one example, the PMI includes indicators indicating inter-RRH components. In one example, the PMI includes indicators indicating intra-RRH components. In one example, the PMI includes indicators indicating both inter-RRH and intra-RRH components. In one example, the PMI includes indicators indicating RRH-selection (as explained in this disclosure).

In one example, the CSI feedback is configured via higher layer (RRC) signaling. In particular, the higher layer parameter reportQuantity can be used. For example, if the UE is configured with a CSI-ReportConfig with the higher layer parameter reportQuantity set to 'cri-RI-i1-CQI', the UE expects, for that CSI-ReportConfig, to be configured with higher layer parameter codebookType set to 'typeI-SinglePanel' or 'typeI-D-MIMO' and pmi-FormatIndicator set to 'widebandPMI' where 'typeI-D-MIMO' indicates a Type I codebook for D-MIMO setup, and the UE shall report a PMI consisting of a single wideband indication ($i_1$) for the entire CSI reporting band. Or, optionally, the UE shall report a PMI consisting of a pair ($i_1$, $i_2$).

In one embodiment V.6, the CSI feedback include CQI (cf. embodiment V.5), e.g., when reportQuantity set to 'cri-RI-i1-CQI', then the CQI is calculated according to at least one of the following examples.

In one example V.6.1, the CQI is calculated conditioned on the reported $i_1$ assuming PDSCH transmission with $N_p \geq 1$ precoders (corresponding to the same $i_1$ but different $i_2$), where the UE assumes that one precoder is randomly selected from the set of $N_p$ precoders for each PRG on PDSCH, where the PRG size for CQI calculation is configured by the higher layer parameter pdsch-BundleSize-ForCSI.

In one example V.6.2, the CQI is calculated conditioned on the reported PMI $i_1$ assuming PDSCH transmission with $N_p \geq 1$ precoders (corresponding to the same but different $i_2$), where the UE assumes a pre-coder cycling scheme, where the pre-coder cycling scheme is according to some examples in this disclosure. In one example, the pre-coder cycling scheme used for the CQI calculation is fixed. In one example, the pre-coder cycling scheme used for the CQI calculation is configured, e.g., via higher layer signaling.

The diversity scheme can also be based on cyclic delay diversity (CDD). A few embodiments and examples of CDD based diversity scheme for the inter-RRH component of the hybrid transmission scheme are provided next.

In another embodiment, the CDD scheme is based on the idea of transmitting on each antenna a circularly shifted version of the same OFDM symbol in the time domain. Hence, the temporal delay introduced on each antenna is transformed into a cyclic delay in the CDD scheme. The CDD scheme turns the MIMO channel into a SIMO channel with enhanced frequency selectivity, and the subsequent frequency diversity may then be extracted by the receiver. In CDD, the cyclic delay reduces the guard interval and hence improves the spectral efficiency. The guard interval in CDD is proportional to the channel length L.

Figure 16:
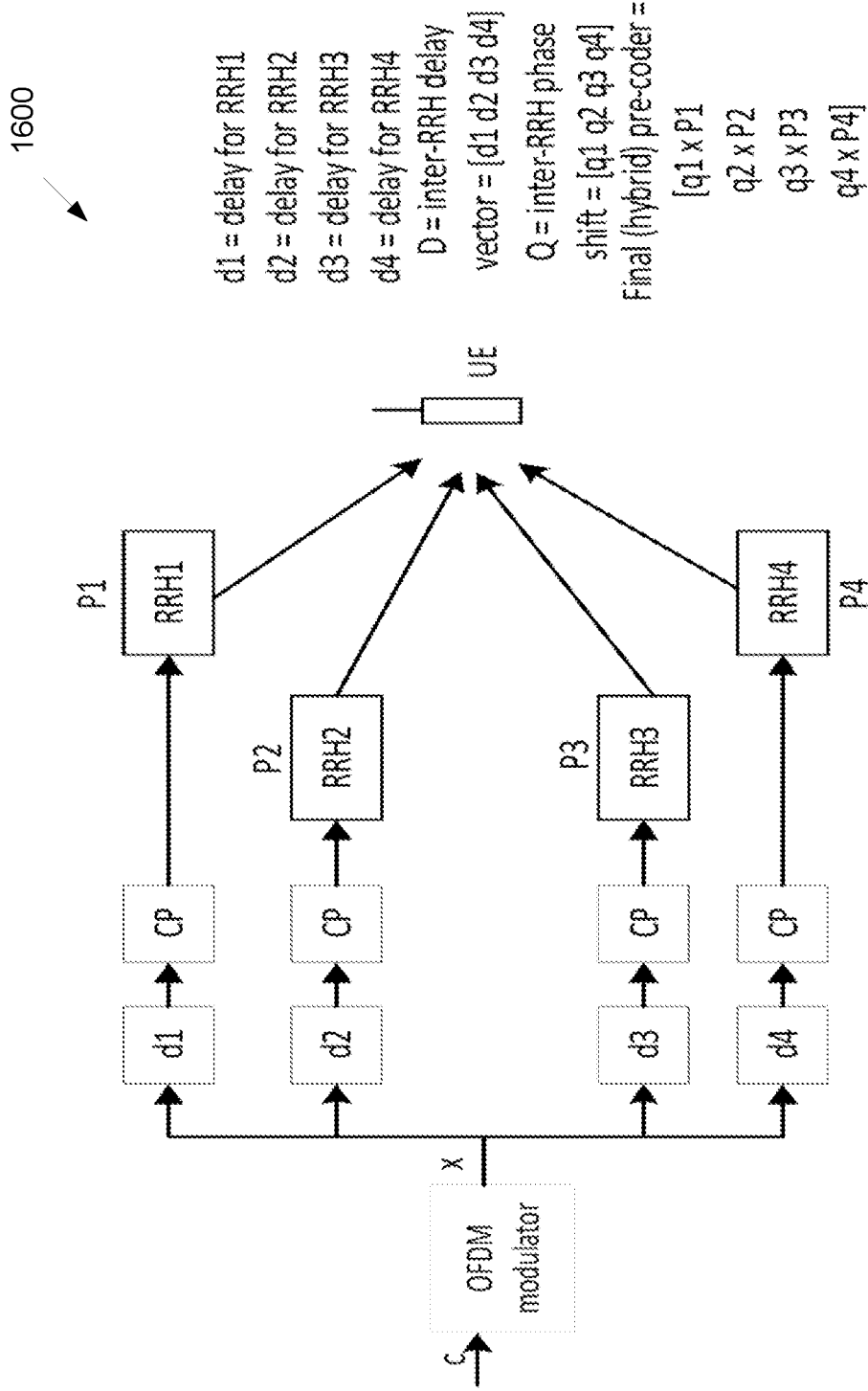
FIG. 16 illustrates an example of a diversity-based scheme for a D-MIMO system.

FIG. 16 illustrates an example of a DL transmission scheme for D-MIMO 1600 where the DL transmission scheme is according to embodiments of the present disclosure. The embodiment of the D-MIMO 1600 illustrated in FIG. 16 is for illustration only. FIG. 16 does not limit the scope of this disclosure to any particular implementation of the example D-MIMO 1600.

In one embodiment VI.1, a UE is configured with a hybrid transmission scheme based on a CDD across RRHs and pre-coding within each RRH. In this scheme, a hybrid pre-coder (for each layer) is given by $$W = R \times Q = \begin{bmatrix} P_1 & 0 & 0 & 0 \\ 0 & P_2 & 0 & 0 \\ 0 & 0 & \ddots & 0 \\ 0 & 0 & 0 & P_{N_{RRH}} \end{bmatrix} \times \begin{bmatrix} q_1 \\ q_2 \\ \vdots \\ q_{N_{RRH}} \end{bmatrix},$$

Where $R = \begin{bmatrix} P_1 & 0 & 0 & 0 \\ 0 & P_2 & 0 & 0 \\ 0 & 0 & \ddots & 0 \\ 0 & 0 & 0 & P_{N_{RRH}} \end{bmatrix}$ is a block diagonal matrix comprising $N_{RRH}$ blocks, the r-th block $P_r$ is a (intra-RRH) pre-coding vector for the r-th RRH, and $$Q = \begin{bmatrix} q_1 \\ q_2 \\ \vdots \\ q_{N_{RRH}} \end{bmatrix}$$

is an inter-RRH phase shift vector across $N_{RRH}$ RRHs that is determined based on the inter-RRH delay vector $$D = \begin{bmatrix} d_1 \\ d_2 \\ \vdots \\ d_{N_{RRH}} \end{bmatrix}.$$

In one example, $$q_r = e^{-j\frac{2\pi}{T}k \times d_r}$$

at the k—the tone (subcarrier) and T is a number of time instances (e.g., in terms of OFDM symbols). This is illustrated in FIG. 16.

The received signal in frequency domain can be written as $$y_k = \frac{1}{t}H_k R Q c_k + n_k = \frac{1}{t}H_k \begin{bmatrix} P_1 & 0 & 0 & 0 \\ 0 & P_2 & 0 & 0 \\ 0 & 0 & \ddots & 0 \\ 0 & 0 & 0 & P_{N_{RRH}} \end{bmatrix} \begin{bmatrix} e^{-j\frac{2\pi}{T}k \times d_1} \\ e^{-j\frac{2\pi}{T}k \times d_2} \\ \vdots \\ e^{-j\frac{2\pi}{T}k \times d_{N_{RRH}}} \end{bmatrix} c_k + n_k =$$

$$\frac{1}{t}\begin{bmatrix} H_{k,1}P_1\left(e^{-j\frac{2\pi}{T}k \times d_1}\right)c_k \\ H_{k,2}P_2\left(e^{-j\frac{2\pi}{T}k \times d_2}\right)c_k \\ \vdots \\ H_{k,N_{RRH}}P_{N_{RRH}}\left(e^{-j\frac{2\pi}{T}k \times d_{N_{RRH}}}\right)c_k \end{bmatrix} + n_k$$

where $H_k$ is a concatenated channel across RRHs at subcarrier k, and $H_{k,r}$ is a corresponding channel for r-th RRH, $n_k$ is an additive noise vector, and $\alpha$ is a scaling factor to normalize power across antennas. In one example, $$t = \frac{1}{\sqrt{\upsilon}} \text{ or } \frac{1}{\sqrt{\upsilon} \times norm(R \times Q)}$$

and $\nu$ is rank (number of layers) value, and norm(Y) is the Euclidean norm of a length-$n_Y$ vector Y, i.e., $$norm(Y) = \sqrt{\sum_{i=0}^{n_Y-1} y_i^2}.$$

In one example, the rank value is fixed, e.g., $\nu=1$. In one example, the rank value is configured to the UE, e.g., from $\{1, 2\}$. In one example, the rank value is reported by the UE, e.g., as part of the CSI report, from the set of supported or allowed rank values. The set of supported or allowed rank valued can be configured via higher layer RRC signaling. For example, rank restriction (RI-restriction) can be used for this configuration.

In one example VI.1.1, for rank >1 (i.e., when v>1), the (hybrid) pre-coder for layer l∈ {1, ..., v} can be expressed as $W^l = R_l \times Q_l$, where $R_l$ and $Q_l$ are according to at least one of the following examples:

In one example VI.1.1.1, $R_l$ is layer-common (i.e., $R_l = R$ for all l) and $Q_l$ is layer-specific (i.e., $Q_1, Q_2, \ldots$, one for each layer).

In one example VI.1.1.2, $R_l$ is layer-specific (i.e., $R_1, R_2, \ldots$, one for each layer) and $Q_l$ is layer-common (i.e., $Q_l = Q$ for all l).

In one example VI.1.1.3, $R_l$ is layer-specific (i.e., $R_1, R_2, \ldots$, one for each layer) and $Q_l$ is layer-specific (i.e., $Q_1, Q_2, \ldots$, one for each layer).

When a component X is layer-common, then one X is used that is common for all layer values; when a component X is layer-specific, then one X is used for each layer.

In one example VI.1.2, the cycling operation (e.g., based on CDD) is performed across RRHs according to at least one of the following examples.

In one example VI.1.2.1, the cycling is performed through all $N_{RRH}$ RRHs.

In one example VI.1.2.2, the cycling is performed through a subset of $N_{RRH}$ RRHs, wherein the subset can be fixed, or the subset can be configured, e.g., via higher layer RRC signaling, or the subset can be determined based on a UE recommendation, where the UE recommendation can be a part of the CSI report (e.g., PMI can include a component indicating the subset of RRHs for cycling).

In one example VI.1.3, the RRH cycling pattern (or sequence) for the inter-RRH CDD (i.e., the RRH sequence in which the CDD is implemented across RRHs) is according to at least one of the following examples.

In one example VI.1.3.1, the RRH cycling pattern (or sequence) is fixed or deterministic.

For example, 1, 2, 3, etc.

In one example VI.1.3.2, the RRH cycling pattern (or sequence) is transparent to the UE, hence is not known to the UE and the gNB (NW) is free to use ant cycling pattern.

In one example VI.1.3.3, the RRH cycling pattern (or sequence) is configured to the UE, for example, via higher layer (RRC) signaling.

In one example VI.1.3.4, the RRH cycling pattern (or sequence) is reported from the UE, for example, as part of the CSI report (e.g., PMI can include a component indicating the RRH cycling pattern).

In the rest of the disclosure, the cycling operation based on CDD across RRHs (component Q) is considered. In particular, examples embodiments are provided on how the inter-RRH delay information $\{d_r\}$ can be acquired at the gNB/NW.

In one embodiment VI.2, a UE is configured with a hybrid transmission scheme which is a variation of the CDD scheme described in embodiment VI.1. In particular, the CDD is replaced with any other delay diversity scheme such as a regular (linear) delay diversity (DD) scheme (which does not require any cyclic shift). Note that the regular (linear) DD can also be used to offset timing difference among RRHs to ensure that the inter-symbol-interference (ISI) does not happen for a given cyclic prefix (CP) length. In the rest of the disclosure, the CDD is assumed as an example of delay diversity scheme. The embodiments and examples of this disclosure, however, are general and are also applicable (or easily extendible) to any other DD scheme (including the regular/linear DD scheme).

In one embodiment VII.1, the inter-RRH delay vector $$D = \begin{bmatrix} d_1 \\ d_2 \\ \vdots \\ d_{N_{RRH}} \end{bmatrix}$$

is determined based on at least one of the following definition of delay.

In one example VII.1.1, the delay $d_r$ associated with r-th RRH is determined based on a round trip delay, wherein the round trip delay is according to at least one of the following examples.

In one example VII.1.1.1, the round trip delay is a sum of a DL-delay and a UL-delay. The DL-delay can be determined based on CSI-RS measurement and delay reporting by the UE and the UL-delay can be determined based on SRS measurement by the gNB.

In one example VII.1.1.2, the round trip delay is a determined by scaling a DL-delay by a factor s, where the scaling factor can be fixed, e.g., s=2, or can be configured or reported by the UE. The DL-delay can be determined based on CSI-RS measurement and delay reporting by the UE.

In one example VII.1.1.3, the round trip delay is a determined by scaling a UL-delay by a factor s, where the scaling factor can be fixed, e.g., s=2, or can be configured or reported by the UE. The UL-delay can be determined based on SRS measurement by the gNB.

In one example VII.1.2, the delay $d_r$ associated with r-th RRH is determined based on a one-way delay, where the one-way delay can be determined based on CSI-RS measurement and delay reporting by the UE, or it can be determined based on SRS measurement by the gNB.

In one embodiment VII.2, a UE is configured to report inter-RRH delay according to at least one of the following examples.

In one example VII.2.1, a single delay value d across all RRHs is reported by the UE. Assuming a linear (uniform) delay diversity scheme across RRHs, a delay at the r-th RRH can be given by $\Delta_r = (r-1)*d$ where r∈ {1, ..., $N_{RRH}$}, and d=delay reported by the UE (e.g., in terms of OFDM symbols).

In one example VII.2.2, a single delay value d across all RRHs is reported by the UE. In addition, a sequence (permutation order) of RRHs, $p^1, p^2, \ldots, p^{N_{RRH}}$ where $p^r \in$ {1, ..., $N_{RRH}$}, is also reported by the UE. Assuming a linear (uniform) delay diversity scheme across RRHs, a delay at the r-th RRH can be given by $\Delta_r = (p^r - 1)*d$ where r∈ {1, ..., $N_{RRH}$}, and d=delay reported by the UE (e.g., in terms of OFDM symbols). Optionally, a sequence (permutation order) of RRHs, $p^1, p^2, \ldots, p^{N_{RRH}}$ where $p^r \in$ {1, ..., $N_{RRH}$}, can be configured to the UE. Optionally, a sequence (permutation order) of RRHs, $p^1, p^2, \ldots, p^{N_{RRH}}$ where $p^r \in$ {1, ..., $N_{RRH}$}, can be fixed.

In one example II.2.3, the RRHs are divided into two subsets, and a single delay value is reported for each subset. So, 2 delay values are reported. For the i-th subset, a delay $\Delta_{r_i} = (r_i - 1)*d_i$ is used at the $r_i$-th RRH in the i-th subset, and $d_i$=delay reported by the UE for the i-th subset (e.g., in terms of OFDM symbols). The two subsets are determined based on at least one of the following examples.

In one example VII.2.3.1, the two subsets of RRHs can be fixed.

In one example VII.2.3.2, the two subsets of RRHs can be configured, e.g., via higher layer RRC signaling.

In one example VII.2.3.3, the number of RRHs in the two subsets are fixed, but two subsets of RRHs (with the fixed sizes) are configured, e.g., via higher layer RRC signaling.

In one example VII.2.3.4, both the number of RRHs in the two subsets and two subsets of RRHs are configured, e.g., via higher layer RRC signaling.

In one example VII.2.3.5, the two subsets of RRHs can be reported by the UE.

In one example VII.2.3.6, the number of RRHs in the two subsets are fixed, but two subsets of RRHs (with the fixed sizes) are reported by the UE.

In one example VII.2.3.8, the number of RRHs in the two subsets are configured, but two subsets of RRHs (with the configured sizes) are reported by the UE.

In one example VII.2.3.9, both the number of RRHs in the two subsets and two subsets of RRHs are reported by the UE.

In a variation, it is straightforward for a skilled-in-the-art to extend this example to more than two subsets of RRHs.

In one example VII.2.4, the RRHs are divided into two subsets, and a single delay value is reported for each subset. So, 2 delay values are reported. In addition, for each subset $i \in \{1,2\}$, a sequence (permutation order) of RRHs, $p^1, p^2, \ldots,$ $$p^1, p^2, \ldots, p^{N_{RRH,r_i}},$$

where $p^{r_i} \in \ldots \{1, \ldots, N_{RRH,r_i}\}$, is also reported by the UE, where $N_{RRH,r_i}$ is a number of RRHs in i-th subset. For the i-th subset, a delay $\Delta_{r_i} = (p^{r_i}-1)*d_i$ is used at the $r_i$-th RRH in the i-th subset, and $d_i$=delay reported by the UE for the i-th subset (e.g., in terms of OFDM symbols). Optionally, a sequence (permutation order) of RRHs, $p^1, p^2, \ldots,$ $$p^1, p^2, \ldots, p^{N_{RRH,r_i}},$$

where $p^{r_i} \in \{1, \ldots, N_{RRH,r_i}\}$, can be configured to the UE. The two subsets are determined based on at least one of the examples II.2.3.1 through II.2.3.9. In a variation, it is straightforward for a skilled-in-the-art to extend this example to more than two subsets of RRHs.

In one example VII.2.5, an absolute delay value is reported for each RRH. So, a total of $N_{RRH}$ delay values are reported. At least one of the following examples is used.

In one example VII.2.5.1, a value for delay $d_r$ is reported using a scalar codebook.

In one example II.2.5.2, the delay $d_r$ is represented as $d_r = d_r^{(1)} d_r^{(2)}$, where $d_r^{(1)}$ and $d_r^{(2)}$ are a first and a second stage delay values. The UE reports $d_r^{(1)}$ and $d_r^{(2)}$ using respective first and second stage codebooks. In one example, $d_r^{(1)} = d^{(1)}$ for all r values, i.e., a single first stage delay value is reported (common) for all RRHs.

In one example VII.2.5.3, the delay $d_r$ is represented as $d_r = d_r^{(2)} - d_r^{(1)}$, where $d_r^{(1)}$ and $d_r^{(2)}$ are a first and a second stage delay values. The UE reports $d_r$ and $d_r$ using respective first and second stage codebooks. In one example, $d_r^{(1)} = d^{(1)}$ for all r values, i.e., a single first stage delay value is reported (common) for all RRHs.

In one example VII.2.5.4, the delay values $d_r$ across RRHs are sorted (in increasing or decreasing order) and sorted delay values (denoted as $\tilde{d}_r$) are reported in a differential manner. For example, assuming sorting of delay values is in increasing order, a differential delay value can be defined as $e_r = \tilde{d}_r - \tilde{d}_{r-1}$ where $\tilde{d}_0 = 0$; and the differential delay values $e_r$ can be reported by the UE using a differential scalar codebook. In addition to the differential delay, the sorting information can also be reported by the UE.

In one example VII.2.5.5, the delay values $d_r$ are reported using a length-$N_{RRH}$ vector codebook.

In one example, the delay for an RRH or the second stage (or the differential component) of the delay for an RRH need not be reported, and hence, the UE may not report it. Such a reporting can be allowed/performed (turned ON or OFF) semi-statically by higher layer configuration or dynamically as part of the delay reporting. When it is based on the delay reporting, a two-part UCI can be used (akin to SB CSI reporting on PUSCH in Rel. 15) since the payload (number of bits) to report the delay reporting can vary depending on the number of delay values are reported by the UE.

In one example II.2.6, a relative delay value is reported for each RRH, wherein the delay value for one reference RRH is fixed (e.g., $d_0$), and the delay values for remaining $N_{RRH}-1$ RRHs are reported with respect to (w.r.t.) the fixed delay value $d_0$. So, a total of $N_{RRH}-1$ delay values are reported. In one example, the fixed value $d_0 = 0$. At least one of the examples II.2.5.1 through II.2.5.5 is used for reporting the $N_{RRH}-1$ delay values except that instead of $N_{RRH}$ absolute delay values, $N_{RRH}-1$ relative delay values are reported. In one example, the reference RRH is fixed (e.g., RRH with index 1). In another example, the reference RRH (index) is configured (e.g., via RRC). In another example, the reference RRH (index) is reported by the UE.

In one embodiment VII.3, a unit of delay reporting is according to at least one of the following examples.

In one example VII.3.1, the unit of delay reporting is in terms of number of OFDM symbols. For example, the candidate (codebook) for delay reporting can be from $C = \{\alpha_0, \alpha_1, \ldots, \alpha_{A-1}\}$, where $\alpha_1$ is defined in terms of number of OFDM symbols. In one example, $\alpha_0 = 1$. In one example, $C = \{1, 2, 3, \ldots, A-1\}$ or $\{1, 2, 4, \ldots, 2^{A-1}\}$.

In one example VII.3.2, the unit of delay reporting is in terms of CP length (y).

In one embodiment VII.4, a UE is configured with a reference signal (RS) configuration for delay reporting according to at least one of the following examples.

In one example VII.4.1, the RS configuration includes at least one CSI-RS resource. In one example, one CSI-RS resource is configured which includes CSI-RS ports for all RRHs. In one example, multiple CSI-RS resources are configured, for example, $N_{RRH}$ CSI-RS resources, one for each RRH, are configured.

In one example, one or multiple CSI-RS resources are configured to at least one or a combination of multiple of the following restrictions.

In one example, the number of CSI-RS ports for delay reporting is restricted to 1 port per RRH.

In one example, the number of CSI-RS ports for delay reporting is restricted to 1 or 2 ports per RRH.

In one example, for 1 CSI-RS port per RRH, CSI-RS density is restricted to either density=3 or density=1, or density 1 or 3 (configured).

In one example, the time domain behavior of the configured CSI-RS resource is restricted, e.g., to aperiodic (AP).

In one example VII.4.2, the RS configuration includes at least one SRS resource. The UE transmits the at least one SRS resource, and the gNB measures it to estimate delay at each RRH.

In one example VII.4.3, the RS configuration includes at least one CSI-RS resource and at least one SRS resource, wherein the RS configuration can be joint (via one configuration) or separate (via two separate configurations). The at least one CSI-RS resource can be configured for delay reporting as explained in example VII.4.1. The at least one SRS can be configured for delay estimation as explained in example VII.4.2. The gNB can use the delay reporting (based on CSI-RS resource) from the UE for calibration purpose, i.e., to calibrate the delay estimation (based on SRS) with the delay reporting.

In a variation, the inter-RRH delay values are acquired at the gNB based on both CSI-RS and SRS. For example, SRS can be used to estimate delay at the gNB, and some information about the estimated delay can be configured/indicated to the UE, which the UE can use for delay reporting based on CSI-RS.

The configuration of delay reporting can be based on a higher layer configuration of parameter ReportQuantity. For example, a new value (e.g., 'delay') can be used for delay reporting.

In one example, the frequency granularity of the delay reporting is wideband (WB), i.e., a single delay value is reported for the entire frequency band configured for the delay reporting.

In one embodiment VII.5, a bit-width (payload or number of bits) B and codebook (CB) for the delay reporting can be according to at least one of the following examples.

In one example VII.5.1, B=1 bit and the CB is one of the two examples shown in Table 1.

Example 1: T is a threshold value, which can be fixed (e.g., $T=t_{sym}$, OFDM symbol) or configured (e.g., via RRC).

Example 2: T1 and T2 are two values such that either T1<T2 (e.g., $T1=t_{sym}$, $T2=2t_{sym}$) or T1>T2 (e.g., $T1=2t_{sym}$, $T2=t_{sym}$).

In one example II.5.2, B=2 bits and the CB is one of the two examples shown in Table 2.

Example 1: T1, T2, and T3 are threshold values, which can be fixed (e.g., $T1=t_{sym}$, $T2=2t_{sym}$, $T3=3t_{sym}$) or configured (e.g., via RRC).

Example 2: T1, T2, T3, and T4 are four values such that either T1<T2<T3<T4 (e.g., $T1=t_{sym}$, $T2=2t_{sym}$, $T3=3t_{sym}$, $T4=4t_{sym}$) or T1>T2>T3>T4 (e.g., $T1=4t_{sym}$, $T2=3t_{sym}$, $T3=2t_{sym}$, $T4=t_{sym}$).

TABLE 1

| | Delay value (X) | |
|---|---|---|
| Bit value | Example 1 | Example 2 |
| 0 | X <= T | T1 |
| 1 | T < X | T2 |

TABLE 2

| | Delay value (x) | |
|---|---|---|
| Bit value | Example 1 | Example 2 |
| 00 | X <= T1 | T1 |
| 01 | T1 < X <= T2 | T2 |
| 10 | T2 < X <= T3 | T3 |
| 11 | T3 < X | T4 |

B can be fixed or configured (e.g., via RRC) or reported by the UE. Alternatively, CB can be fixed or configured (e.g., via RRC) or reported by the UE. Alternatively, B and CB can be fixed or configured (e.g., via RRC) or reported by the UE.

Whether the UE can report the delay report can be configured, e.g., via higher layer RRC signaling. Also, whether a UE is capable of such reporting is indicated by the UE in its capability reporting and the configuration of the delay report is subject to the reported UE capability.

The delay reporting is subject to a restriction. For instance, at least one of the following examples is used as the restriction.

In one example, a measurement RS (e.g., CSI-RS) with only 1 port can be used/configured.

In one example, only periodic measurement RSs (such SSB, CSI-RS, TRS) can be used/configured.

In one example, only aperiodic measurement RSs (such CSI-RS) can be used/configured.

In one example, only semi-persistent measurement RSs (such CSI-RS) can be used/configured.

In one example, the delay reporting can be multiplexed only with a WB CSI report, where the CSI report is periodic or semi-persistent.

In one example, the delay reporting can be reported only via PUCCH.

In one example, the delay reporting can be reported only when rank 1 is reported via RI, but the max allowed rank value can be more than 1.

In one embodiment VII.6, a UE is configured with the delay reporting that can be transmitted, for example, as part of the CSI report (hence multiplexed with other CSI parameters), and/or by multiplexing it with HARQ-ACK transmission and/or Scheduling Request (SR). In one example, the delay reporting can be transmitted via SR if it's payload (number of bits) is less or equal to B1 (e.g., B1=1). In one example, the delay reporting can be transmitted via HARQ-ACK if it's payload (number of bits) is less or equal to B1 (e.g., B1=1). In one example, the delay reporting can be transmitted via SR or HARQ-ACK if the number of RRHs=2 (i.e., number of delay reporting is 1).

When multiplexed with other CSI parameters, at least one of the following examples can be used.

In one example, the delay reporting is via a separate (new) CSI parameter, e.g., DI (Delay indicator).

In one example, the delay reporting is joint with an existing CSI parameter (p), and the parameter (p) when reported indicates both a value for the CSI existing parameter and the delay reporting. At least one of the following examples can be used for the existing CSI parameter (p).

In one example, the parameter (p) is a rank indicator (RI). When reported, RI indicates both a value for the rank and the delay reporting.

In one example, the parameter (p) is a CSI-RS resource indicator (CRI). When reported, CRI indicates both a CSI-RS resource and the delay reporting.

In one example, the parameter (p) is a layer indicator (LI). When reported, LI indicates both a layer and the delay reporting.

In one example, the parameter (p) is a precoding matrix indicator (PMI) for a 2 port CSI-RS resource. When reported, PMI indicates both a precoding matrix and the delay reporting.

In one example, the parameter (p) is a first precoding matrix indicator (PMI1) for a X>2 port CSI-RS resource. When reported, PMI1 indicates both first components of a precoding matrix and the delay reporting.

In one example, the parameter (p) is a second precoding matrix indicator (PMI2) for a X>2 port CSI-RS resource. When reported, PMI2 indicates both second components of a precoding matrix and the delay reporting.

In one example, the parameter (p) is a channel quality indicator (CQI). When reported, CQI indicates both a CQI value and delay reporting.

In one example, the parameter (p) is a layer 1 RSRP (L1-RSRP). When reported, L1-RSRP indicates both a RSRP value and the delay reporting.

In one example, the parameter (p) is a layer 1 SINR (L1-SINR). When reported, L1-SINR indicates both a SINR value and the delay reporting.

In one example, the delay reporting is using reserved or unused code points of an existing CSI parameter (p) to indicate the delay reporting. At least one of the following examples can be used for the existing CSI parameter (p).

In one example, the parameter (p) is a rank indicator (RI).

In one example, the parameter (p) is a CSI-RS resource indicator (CRI).

In one example, the parameter (p) is a layer indicator (LI).

In one example, the parameter (p) is a precoding matrix indicator (PMI) for a 2 port CSI-RS resource.

In one example, the parameter (p) is a first precoding matrix indicator (PMI1) for a X>2 port CSI-RS resource.

In one example, the parameter (p) is a second precoding matrix indicator (PMI2) for a X>2 port CSI-RS resource.

In one example, the parameter (p) is a channel quality indicator (CQI).

In one example, the parameter (p) is a layer 1 RSRP (L1-RSRP).

In one example, the parameter (p) is a layer 1 SINR (L1-SINR).

In one example, the usage of an existing CSI parameter (p) can be configured (e.g., RRC) as either as a CSI parameter or as a parameter for the delay reporting. A code point of the parameter (p) indicates either the CSI parameter or the delay reporting depending on the configured usage.

Figure 17:
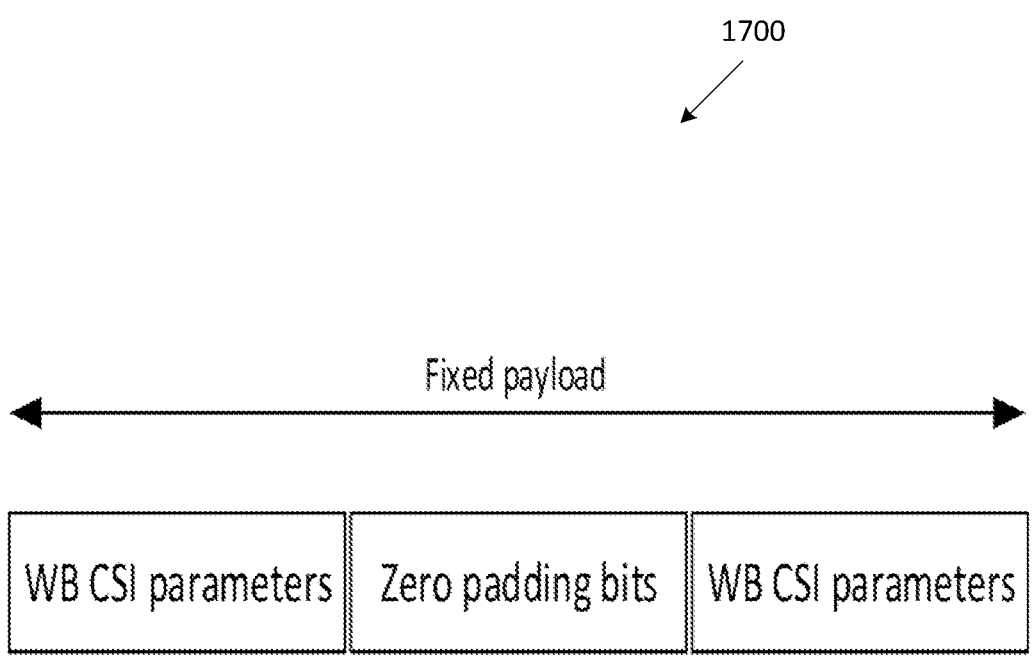
FIG. 17 illustrates an example of delay reporting with a fixed payload according to embodiments of the present disclosure.

FIG. 17 illustrates an example of delay reporting 1700 according to embodiments of the present disclosure. The embodiment of the delay reporting 1700 illustrated in FIG. 17 is for illustration only. FIG. 17 does not limit the scope of this disclosure to any particular implementation of the example of delay reporting 1700.

The delay reporting can be multiplexed with a periodic or semi-persistent (P/SP) CSI with wideband (WB) reporting. For such WB CSI reporting, the CSI payload (number of bits) can be fixed regardless of the value of the reported CSI parameters such as RI (although the CSI payload can vary for different rank values). In order to ensure fixed CSI payload, a number of zero-padding bits can be appended with the CSI bits (cf. FIG. 17). At least one of the following examples can be used for multiplexing the delay reporting with the WB CSI.

In one example, a portion or all of the zero padding bits appended in the WB CSI report is used to report the delay reporting. The least significant bits (LSBs) of the zero padding bits can be used for the delay reporting. Alternatively, the most significant bits (MSBs) of the zero padding bits can be used for the delay reporting.

In one example, the delay reporting is multiplexed with the WB CSI parameters, wherein the multiplexing method is according to one of the examples described above.

Figure 18:
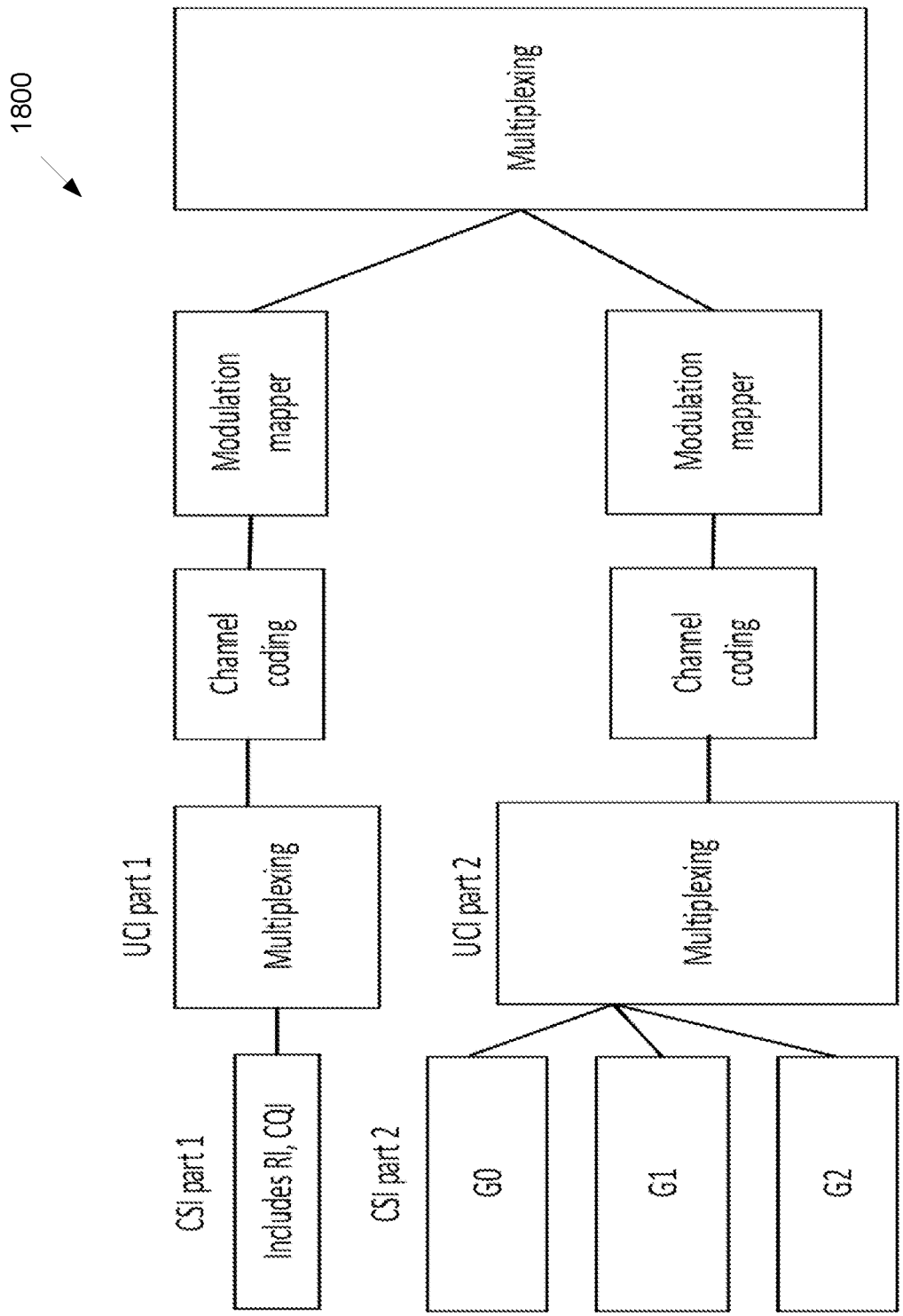
FIG. 18 illustrates another example of delay reporting via a two-part uplink control information (UCI)

FIG. 18 illustrates another example of delay reporting 1800 according to embodiments of the present disclosure. The embodiment of the delay reporting 1800 illustrated in FIG. 18 is for illustration only. FIG. 18 does not limit the scope of this disclosure to any particular implementation of the example of delay reporting 1800.

The delay reporting can be multiplexed with an aperiodic (AP) CSI with subband (SB) reporting. For such SB reporting, the CSI can be partitioned into two parts, CSI part 1 and CSI part 2. The CSI part 1 includes RI and CQI (for the first codeword), and is multiplexed with UCI part 1. The CSI report includes LI, PMI, and CQI (for the second codeword when rank >4 is reported), and is multiplexed with UCI part 2. Here, UCI part 1 and UCI part 2 are parts of a two-part UCI (cf. FIG. 18). At least one of the following examples can be used for multiplexing the delay reporting with the SB CSI.

In one example, the delay reporting is multiplexed with a CSI parameter in CSI part 1. For example, the delay reporting is multiplexed with CQI (for the first code word) or RI, wherein the multiplexing method is according to one of the examples described above.

In one example, the delay reporting is multiplexed with a CSI parameter in CSI part 2. For example, the delay reporting is multiplexed with CQI (for the second code word when rank >4 is reported) or PMI or LI, wherein the multiplexing method is according to one of the examples described above.

In one example, the CSI part 2 is partitioned into three groups G0, G1, and G2 (as in Rel. 15/16 SB CSI reporting) and the UE reports either G0 or (G0, G1) or (G0, G1, G2) depending on the resource allocation for the CSI reporting and the total CSI part 2 payload (as described in UCI omission in Rel. 15/16 NR specification).

In one example, the delay reporting is multiplexed with a CSI parameter in G0, wherein the multiplexing method is according to one of the examples described above.

In one example, the delay reporting is multiplexed with a CSI parameter in G0 if only G0 is transmitted (reported) in UCI part 2 (i.e., G1 and G2 are omitted or not reported); the delay reporting is multiplexed with a CSI parameter in G1 if only (G0, G1) is transmitted (reported) in UCI part 2 (i.e., G2 is omitted or not reported); and the delay reporting is multiplexed with a CSI parameter in G2 if (G0, G1, G2) is transmitted (reported) in UCI part 2.

In one embodiment VIII.1, the inter-RRH phase shift vector Q is a combination (product) of a selection vector and a phase shift vector, where the selection vector selects n out of $N_{RRH}$ RRHs and the phase shift vector is for the selected n RRHs, i.e., $$Q = S_n \times U_n = [e_{r_1}^{N_{RRH}} e_{r_2}^{N_{RRH}} \ldots e_{r_n}^{N_{RRH}}] \times U_n$$

where $1 < n \leq N_{RRH}$, $(r_1, r_2, \ldots r_n)$ are indices of the selected n RRHs, where $r_j \in \{1, \ldots, N_{RRH}\}$, $e_i^I$ is a I-element selection vector containing non-zero value (e.g., a value of 1) in element i and zeros elsewhere, and $U_n$ is a size n×1 phase shift vector for the selected n RRHs.

The inter-RRH phase shift vector Q is used/selected such that the CDD is performed across RRHs. The UE reports both $S_n$ and $U_n$ as part of the delay reporting. For $S_n$ reporting, the UE reports the indices of the selected RRHs. This reporting can be based on a bitmap (or bit sequence) of length $N_{RRH}$, or a combinatorial index with a payload of $$\left\lceil \log_2 \binom{N_{RRH}}{n} \right\rceil \text{ bits.}$$

For $U_n$, the delay values of the selected RRHs are determined based on some embodiments or examples of this disclosure.

In one example VIII.1.1, the value n is determined according to at least one of the following examples.

In one example VIII.1.1.1, the value n is fixed, e.g., n=2.

In one example VIII.1.1.2, the value n is determined based on the value $N_{RRH}$, e.g., n=min(t, $N_{RRH}$) where t is fixed, or n=$N_{RRH}$/2.

In one example VIII.1.1.3, the value n is configured, e.g., vie higher layer (RRC) signaling.

In one example VIII.1.1.4, the value n is recommended by the UE, e.g., as part of UE capability signaling or as part of the CSI report. When n is reported by the UE, a two-part UCI can be used for the delay reporting.

Any of the above variation embodiments can be utilized independently or in combination with at least one other variation embodiment.

Figure 19:
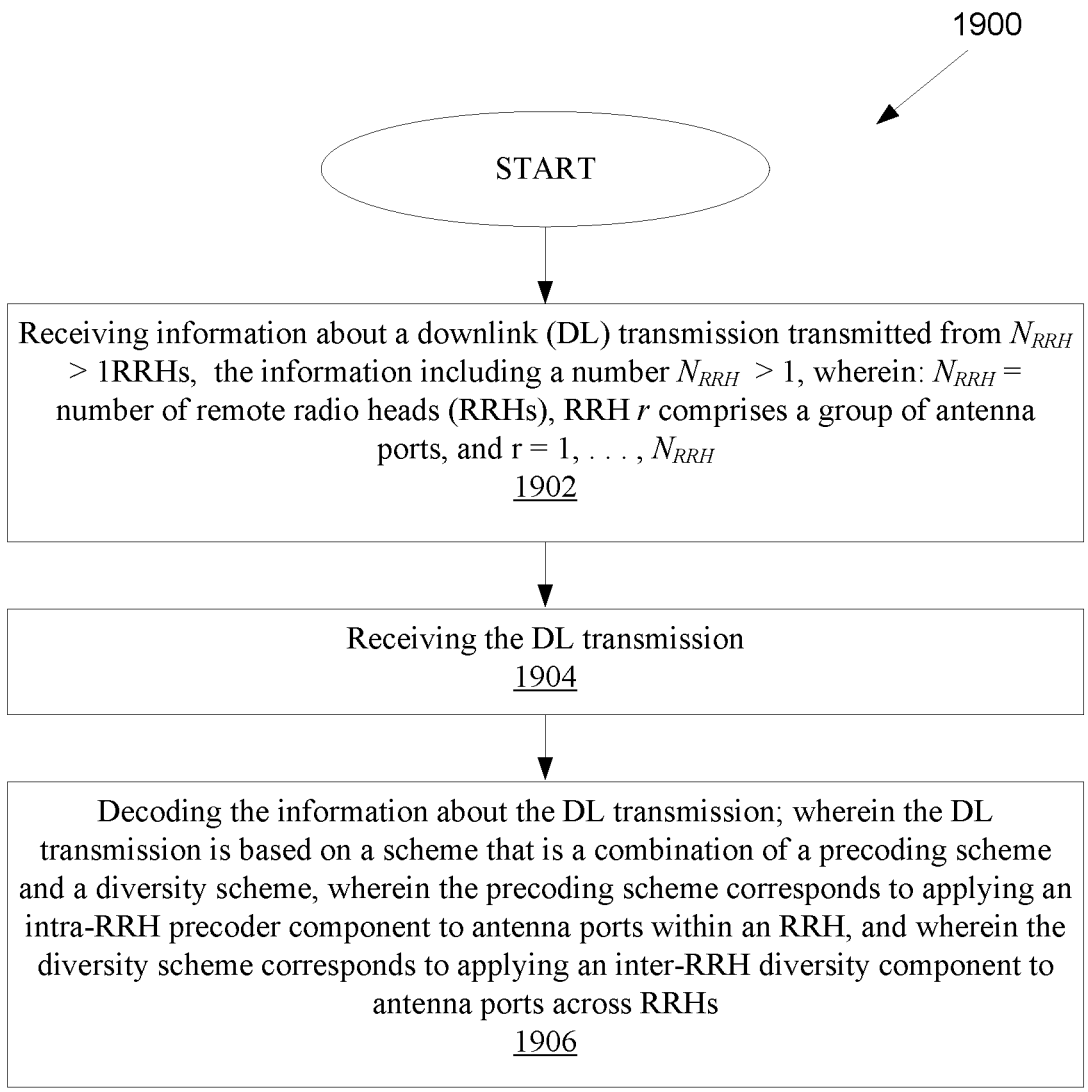
FIG. 19 illustrates a flow chart of a method for operating a UE according to embodiments of the present disclosure.

FIG. 19 illustrates a flow chart of a method 1900 for operating a user equipment (UE), as may be performed by a UE such as UE 116, according to embodiments of the present disclosure. The embodiment of the method 1900 illustrated in FIG. 19 is for illustration only. FIG. 24 does not limit the scope of this disclosure to any particular implementation.

As illustrated in FIG. 19, the method 1900 begins at step 1902. In step 1902, the UE (e.g., 111-116 as illustrated in FIG. 1) receives information about a downlink (DL) transmission transmitted from $N_{RRH}$>1 RRHs, wherein: $N_{RRH}$=number of remote radio heads (RRHs), RRH r comprises a group of antenna ports, and r=1, . . . , $N_{RRH}$.

In step 1904, the UE receives the DL transmission.

In step 1906, the UE decodes the information about the DL transmission; wherein the DL transmission is based on a scheme that is a combination of a precoding scheme and a diversity scheme, wherein the precoding scheme corresponds to applying an intra-RRH precoder component to antenna ports within an RRH, and wherein the diversity scheme corresponds to applying an inter-RRH diversity component to antenna ports across RRHs.

In one embodiment, the diversity scheme comprises RRH cycling, in a given time-frequency resource, the DL transmission is transmitted from one RRH, and the one RRH is cycled from RRH 1, . . . , RRH $N_{RRH}$ through time-frequency resources that are allocated for the DL transmission.

In one embodiment, an RRH selection is performed based on a subset comprising n out of $N_{RRH}$ RRHs, the DL transmission is from the subset of n out of $N_{RRH}$ RRHs, and 1<n<$N_{RRH}$.

In one embodiment, the diversity scheme comprises precoder cycling, the inter-RRH diversity component corresponds to inter-RRH precoders, and the inter-RRH precoders are cycled through time-frequency resources that are allocated for the DL transmission.

In one embodiment, the precoder cycling is based on a per frequency domain (FD) unit, where the FD unit is one of a physical resource block group (PRG), a physical resource block (PRB), a subband (SB), or a resource element (RE).

In one embodiment, the diversity scheme comprises delay diversity, and a delay information from each RRH is used to obtain a corresponding inter-RRH diversity component.

In one embodiment, the delay information from each RRH is based on a round-trip delay or a one-way delay, where the round-trip delay is based on both a DL delay and an UL delay, and the one-way delay is based on one of either a DL delay or an UL delay.

Figure 20:
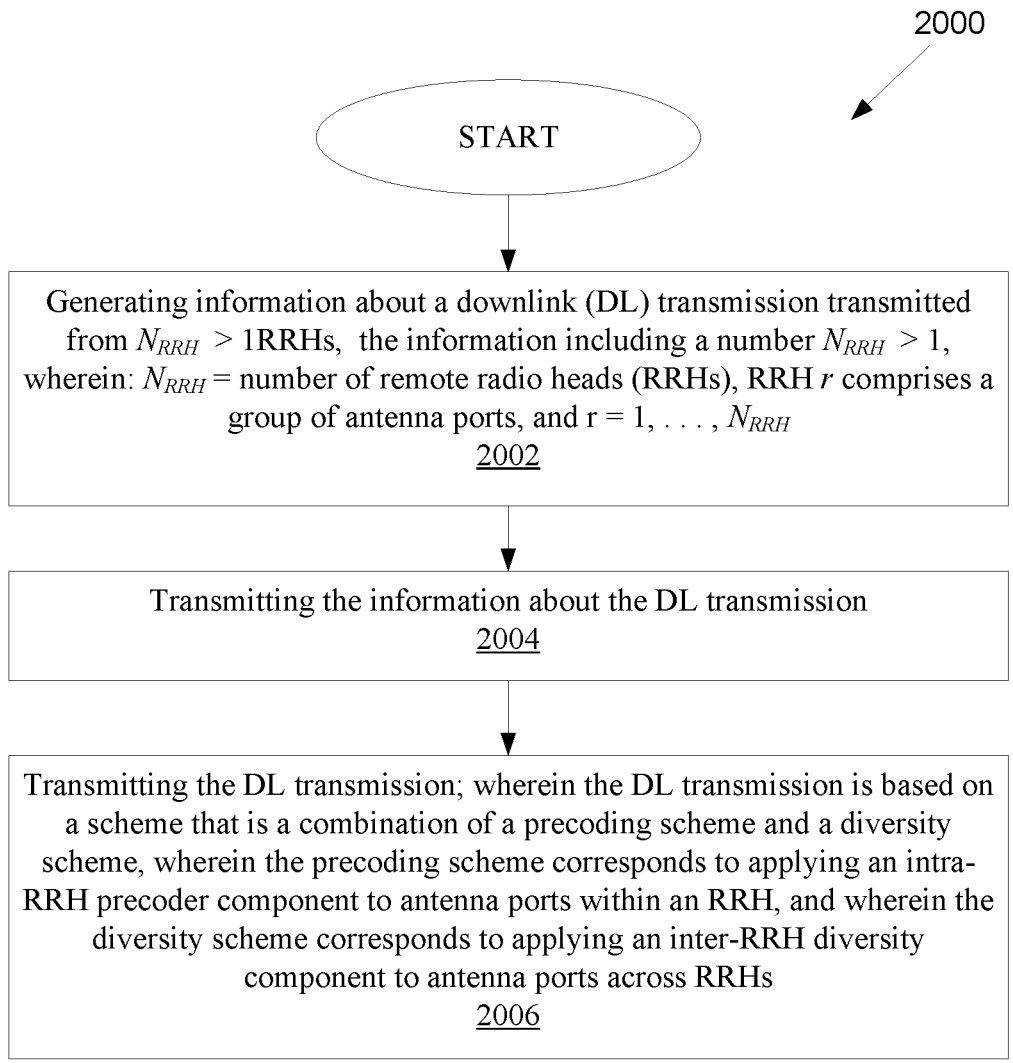
FIG. 20 illustrates a flow chart of a method for operating a BS according to embodiments of the present disclosure.

FIG. 20 illustrates a flow chart of another method 2000, as may be performed by a base station (BS) such as BS 102, according to embodiments of the present disclosure. The embodiment of the method 2000 illustrated in FIG. 20 is for illustration only. FIG. 20 does not limit the scope of this disclosure to any particular implementation.

As illustrated in FIG. 20, the method 2000 begins at step 2002. In step 2002, the BS (e.g., 101-103 as illustrated in FIG. 1), generates information about a downlink (DL) transmission transmitted from $N_{RRH}$>1 RRHs, wherein: $N_{RRH}$=number of remote radio heads (RRHs), RRH r comprises a group of antenna ports, and r=1, . . . , $N_{RRH}$.

In step 2004, the BS transmits the information about the DL transmission.

In step 2006, the BS transmits the DL transmission; wherein the DL transmission is based on a scheme that is a combination of a precoding scheme and a diversity scheme, wherein the precoding scheme corresponds to applying an intra-RRH precoder component to antenna ports within an RRH, and wherein the diversity scheme corresponds to applying an inter-RRH diversity component to antenna ports across RRHs.

In one embodiment, the diversity scheme comprises RRH cycling, in a given time-frequency resource, the DL transmission is transmitted from one RRH, and the one RRH is cycled from RRH 1, . . . , RRH $N_{RRH}$ through time-frequency resources that are allocated for the DL transmission.

In one embodiment, an RRH selection is performed based on a subset comprising n out of $N_{RRH}$ RRHs, the DL transmission is from the subset of n out of $N_{RRH}$ RRHs, and 1<n<$N_{RRH}$.

In one embodiment, the diversity scheme comprises precoder cycling, the inter-RRH diversity component corresponds to inter-RRH precoders, and the inter-RRH precoders are cycled through time-frequency resources that are allocated for the DL transmission.

In one embodiment, the precoder cycling is based on a per frequency domain (FD) unit, where the FD unit is one of a physical resource block group (PRG), a physical resource block (PRB), a subband (SB), or a resource element (RE).

In one embodiment, the diversity scheme comprises delay diversity, and a delay information from each RRH is used to obtain a corresponding inter-RRH diversity component.

In one embodiment, the delay information from each RRH is based on a round-trip delay or a one-way delay, where the round-trip delay is based on both a DL delay and an UL delay, and the one-way delay is based on one of either a DL delay or an UL delay.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive information about a downlink (DL) transmission transmitted from N_RRH>1 remote radio head (RRH), wherein:
N_RRH is a number of remote radio heads (RRHs), RRH r comprises a group of antenna ports, and r=1, . . . , N_RRH; and
receive the DL transmission; and
a processor operably coupled to the transceiver, the processor configured to decode the information about the DL transmission;
wherein the DL transmission is based on a precoding scheme and a diversity scheme,
wherein the precoding scheme corresponds to applying an intra-RRH precoder component to antenna ports within an RRH, and
wherein the diversity scheme corresponds to applying an inter-RRH diversity component to antenna ports across RRHs.

2. The UE of claim 1, wherein:
the diversity scheme comprises RRH cycling,
in a given time-frequency resource, the DL transmission is transmitted from one RRH, and
the one RRH is cycled from RRH 1, . . . , RRH N_RRH through time-frequency resources that are allocated for the DL transmission.

3. The UE of claim 1, wherein:
an RRH selection is performed based on a subset comprising n out of N_RRH RRHs,
the DL transmission is from the subset of n out of N_RRH RRHs, and
1<n<N_RRH.

4. The UE of claim 1, wherein:
the diversity scheme comprises precoder cycling,
the inter-RRH diversity component corresponds to inter-RRH precoders, and
the inter-RRH precoders are cycled through time-frequency resources that are allocated for the DL transmission.

5. The UE of claim 4, wherein the precoder cycling is based on a per frequency domain (FD) unit, where the FD unit is one of a physical resource block group (PRG), a physical resource block (PRB), a subband (SB), or a resource element (RE).

6. The UE of claim 1, wherein:
the diversity scheme comprises delay diversity, and
a delay information from each RRH is used to obtain a corresponding inter-RRH diversity component.

7. The UE of claim 6, wherein the delay information from each RRH is based on a round-trip delay or a one-way delay, where the round-trip delay is based on both a DL delay and an UL delay, and the one-way delay is based on one of either a DL delay or an UL delay.

8. A base station (BS) comprising:
a processor configured to generate information about a downlink (DL) transmission transmitted from N_RRH>1 remote radio head (RRH), wherein:
N_RRH is a number of remote radio heads (RRHs), RRH r comprises a group of antenna ports, and r=1, . . . , N_RRH; and
a transceiver operably coupled to the processor, the transceiver configured to:
transmit the information about the DL transmission, and
transmit the DL transmission;
wherein the DL transmission is based on a precoding scheme and a diversity scheme,
wherein the precoding scheme corresponds to applying an intra-RRH precoder component to antenna ports within an RRH, and
wherein the diversity scheme corresponds to applying an inter-RRH diversity component to antenna ports across RRHs.

9. The BS of claim 8, wherein:
the diversity scheme comprises RRH cycling,
in a given time-frequency resource, the DL transmission is transmitted from one RRH, and
the one RRH is cycled from RRH 1, . . . , RRH N_RRH through time-frequency resources that are allocated for the DL transmission.

10. The BS of claim 8, wherein:
an RRH selection is performed based on a subset comprising n out of N_RRH RRHs,
the DL transmission is from the subset of n out of N_RRH RRHs, and
1<n<N_RRH.

11. The BS of claim 8, wherein:
the diversity scheme comprises precoder cycling,
the inter-RRH diversity component corresponds to inter-RRH precoders, and
the inter-RRH precoders are cycled through time-frequency resources that are allocated for the DL transmission.

12. The BS of claim 11, wherein the precoder cycling is based on a per frequency domain (FD) unit, where the FD unit is one of a physical resource block group (PRG), a physical resource block (PRB), a subband (SB), or a resource element (RE).

13. The BS of claim 8, wherein:
the diversity scheme comprises delay diversity, and
a delay information from each RRH is used to obtain a corresponding inter-RRH diversity component.

14. The BS of claim 13, wherein the delay information from each RRH is based on a round-trip delay or a one-way delay, where the round-trip delay is based on both a DL delay and an UL delay, and the one-way delay is based on one of either a DL delay or an UL delay.

15. A method for operating a user equipment (UE), the method comprising:
receiving information about a downlink (DL) transmission transmitted from N_RRH>1 remote radio head (RRH), wherein:
N_RRH is a number of remote radio heads (RRHs), RRH r comprises a group of antenna ports, and r=1, . . . , N_RRH;
receiving the DL transmission; and
decoding the information about the DL transmission;
wherein the DL transmission is based on a precoding scheme and a diversity scheme, wherein the precoding scheme corresponds to applying an intra-RRH precoder component to antenna ports within an RRH, and wherein the diversity scheme corresponds to applying an inter-RRH diversity component to antenna ports across RRHs.

16. The method of claim 15, wherein:

the diversity scheme comprises RRH cycling, in a given time-frequency resource, the DL transmission is transmitted from one RRH, and the one RRH is cycled from RRH 1, . . . , RRH N_RRH through time-frequency resources that are allocated for the DL transmission.

17. The method of claim 15, wherein:

an RRH selection is performed based on a subset comprising n out of N_RRH RRHs, the DL transmission is from the subset of n out of N_RRH RRHs, and 1<n<N_RRH.

18. The method of claim 15, wherein:

the diversity scheme comprises precoder cycling, the inter-RRH diversity component corresponds to inter-RRH precoders, and the inter-RRH precoders are cycled through time-frequency resources that are allocated for the DL transmission.

19. The method of claim 18, wherein the precoder cycling is based on a per frequency domain (FD) unit, where the FD unit is one of a physical resource block group (PRG), a physical resource block (PRB), a subband (SB), or a resource element (RE).

20. The method of claim 15, wherein:

the diversity scheme comprises delay diversity, and a delay information from each RRH is used to obtain a corresponding inter-RRH diversity component.

* * * * *